(12) United States Patent
Oguro et al.

(10) Patent No.: US 11,008,009 B2
(45) Date of Patent: May 18, 2021

(54) VEHICLE CONTROL DEVICE

(71) Applicant: HONDA MOTOR CO., LTD., Tokyo (JP)

(72) Inventors: Hiroshi Oguro, Wako (JP); Daichi Kato, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 189 days.

(21) Appl. No.: 16/338,845

(22) PCT Filed: Oct. 3, 2017

(86) PCT No.: PCT/JP2017/035988
§ 371 (c)(1),
(2) Date: Apr. 2, 2019

(87) PCT Pub. No.: WO2018/066560
PCT Pub. Date: Apr. 12, 2018

(65) Prior Publication Data
US 2020/0114917 A1    Apr. 16, 2020

(30) Foreign Application Priority Data

Oct. 3, 2016  (JP) .............................. JP2016-195503

(51) Int. Cl.
*B60W 30/18* (2012.01)
*B60W 30/16* (2020.01)
*G05D 1/02* (2020.01)

(52) U.S. Cl.
CPC .... *B60W 30/18018* (2013.01); *B60W 30/162* (2013.01); *B60W 30/181* (2013.01); *G05D 1/0217* (2013.01); *G05D 1/0223* (2013.01)

(58) Field of Classification Search
CPC ......... B60W 30/18018; B60W 30/162; B60W 30/181; B60W 2556/20; B60W 60/001;
(Continued)

(56) References Cited

U.S. PATENT DOCUMENTS

2010/0121549 A1  5/2010  Fukuda et al.
2014/0088849 A1* 3/2014  Ham .................. B60W 30/143
                                                  701/70
(Continued)

FOREIGN PATENT DOCUMENTS

JP    2003-051100 A    2/2003
JP    2010-111350 A    5/2010
(Continued)

OTHER PUBLICATIONS

PCT/ISA/210 from International Application PCT/JP2017/035988 with the English translation thereof.

*Primary Examiner* — Rodney A Butler
(74) *Attorney, Agent, or Firm* — Carrier, Blackman & Associates, P.C.; Joseph P. Carrier; Jeffrey T. Gedeon

(57) ABSTRACT

This vehicle control device is provided with: an external sensor which detects a vehicle stop position; a vehicle sensor which detects the vehicle speed; a remaining distance calculation unit which calculates the remaining distance; and a short-term trajectory generation unit which sets a target speed on the basis of the remaining distance and the vehicle speed. Furthermore, the short-term trajectory generation unit of the vehicle control device performs correction for increasing the degree of deceleration if a predicted stop position from a prediction unit is predicted to go beyond the vehicle stop position, and performs correction for reducing the degree of deceleration of the host vehicle if the predicted stop position is predicted to be before the vehicle stop position.

12 Claims, 18 Drawing Sheets

(58) Field of Classification Search
CPC ....... B60W 2520/10; B60W 2720/106; B60W 2720/10; B60W 2552/53; B60W 2555/60; B60W 30/18109; B60W 30/18072; G05D 1/0217; G05D 1/0223; B60T 7/12
See application file for complete search history.

(56) References Cited

U.S. PATENT DOCUMENTS

| | | | |
|---|---|---|---|
| 2014/0309903 A1* | 10/2014 | Otake | G08G 1/096708 701/70 |
| 2015/0258993 A1* | 9/2015 | Chakravarty | B60W 30/20 701/93 |
| 2016/0121898 A1* | 5/2016 | Jo | B60W 30/18072 701/22 |
| 2017/0015328 A1* | 1/2017 | Oguri | B60W 50/0097 |

FOREIGN PATENT DOCUMENTS

| | | |
|---|---|---|
| JP | 4646990 B2 | 3/2011 |
| JP | 2011-129139 A | 6/2011 |
| JP | 2013-154813 A | 8/2013 |

\* cited by examiner

FIG. 18A

| VEHICLE STOP POSITION OBJECT | CORRECTION DETERMINATION |
|---|---|
| TRAFFIC LIGHT STOP LINE | PERFORM |
| TEMPORARY STOP LINE | PERFORM |
| PRECEDING VEHICLE | NOT PERFORM |
| ⋮ | ⋮ |

FIG. 18B

| RELIABILITY | LOW | HIGH |
|---|---|---|
| CORRECTION DETERMINATION | NOT PERFORM | PERFORM |

VEHICLE CONTROL DEVICE

TECHNICAL FIELD

The present invention relates to a vehicle control device that performs automated driving or driving assistance of a vehicle.

BACKGROUND ART

One example of a vehicle control device, which performs automated driving or driving assistance of a vehicle (host vehicle), is disclosed in Japanese Patent No. 4646990. This vehicle control device performs stop control of detecting a vehicle stop position and then decelerating and stopping the host vehicle in accordance with the vehicle stop position.

Incidentally, in this type of stop control, stopping the vehicle actually at the vehicle stop position while the deceleration is left, a vehicle occupant feels weighting and the ride quality decreases. Moreover, the host vehicle may move relative to the vehicle stop position and the actual stop position may deviate. Furthermore, in the stop control, it has been desired to reduce an error or the like as much as possible in detecting the vehicle stop position by stopping the vehicle at the vehicle stop position more accurately.

SUMMARY OF INVENTION

The present invention has been made in view of the above circumstance, and an object is to provide a vehicle control device that can predict an actual stop position of a vehicle with respect to a vehicle stop position, and by changing content of deceleration of the vehicle in accordance with the predicted circumstance, stop the vehicle more accurately.

In order to achieve the above object, a vehicle control device according to the present invention includes: a vehicle state detection unit configured to detect a vehicle speed of a host vehicle; a vehicle stop position detection unit configured to detect a vehicle stop position existing ahead of the host vehicle in a traveling direction thereof; a remaining distance calculation unit configured to calculate a remaining distance from the host vehicle to the detected vehicle stop position; a target speed setting unit configured to set a target speed of the host vehicle on a basis of the remaining distance and the vehicle speed; and a prediction unit configured to predict a stop prediction position where the host vehicle actually stops, on a basis of detection information from the vehicle state detection unit, wherein the target speed setting unit is configured to correct the target speed so as to enhance a degree of deceleration of the host vehicle when it is predicted that the stop prediction position will be set beyond the vehicle stop position and weaken the degree of the deceleration of the host vehicle when it is predicted that the stop prediction position will be set before the vehicle stop position.

As described above, the target speed setting unit of the vehicle control device enhances the degree of the deceleration of the host vehicle when it is predicted that the stop prediction position will be set beyond the vehicle stop position, and weakens the degree of the deceleration of the host vehicle when it is predicted that the stop prediction position will be set before the vehicle stop position. Thus, the host vehicle can be decelerated so as to get closer to the vehicle stop position. That is to say, the vehicle control device changes content of the deceleration in accordance with the predicted circumstance, so that the vehicle can be stopped more accurately at the vehicle stop position, the ride quality is improved, and an error or the like in detecting the vehicle stop position can be reduced as much as possible.

In addition, the target speed setting unit may be configured to set a plurality of jerks each corresponding to a rate of change of acceleration or the deceleration of the host vehicle, calculate speeds in accordance with the plurality of jerks, and obtain the target speed among the speeds, and the target speed setting unit may further be configured to change a setting range for setting the plurality of jerks in accordance with the stop prediction position.

The vehicle control device can generate the plurality of jerks in accordance with various circumstances by changing the setting range of the plurality of jerks in accordance with the stop prediction position. Therefore, the vehicle control device can achieve the target speed for stopping the host vehicle at the vehicle stop position more accurately on the basis of the plurality of jerks.

In addition to the above configuration, the target speed setting unit may be configured to narrow the setting range of the plurality of jerks when the vehicle stop position is detected, as compared to the setting range of the plurality of jerks when the vehicle stop position is not detected.

The vehicle control device can set the target speed for stopping the vehicle in more detail by narrowing the setting range of the plurality of jerks when the vehicle stop position is detected.

Furthermore, the target speed setting unit is preferably configured to set the setting range of the plurality of jerks so that the jerk becomes less than or equal to zero when the degree of the deceleration of the host vehicle is enhanced.

The vehicle control device can easily obtain the plurality of jerks that is less than or equal to zero by setting the setting range of the plurality of jerks so that the jerk becomes less than or equal to zero. As a result, the target speed for enhancing the degree of the deceleration of the vehicle can be calculated in more detail.

Here, the target speed setting unit may be configured to compare a determination threshold that is set in advance and a relative distance of the stop prediction position with respect to the vehicle stop position if it is predicted that the stop prediction position will be set before the vehicle stop position, and if the relative distance is more than the determination threshold, the target speed may be corrected so that the degree of the deceleration of the host vehicle is continuously weakened, and if the relative distance is less than or equal to the determination threshold, the target speed may be corrected so that the deceleration of the host vehicle becomes zero at the vehicle stop position.

If the relative distance is less than or equal to the determination threshold, the target speed is corrected so that the deceleration of the host vehicle becomes zero at the vehicle stop position; thus, the acceleration of the vehicle at the vehicle stop position becomes zero. Therefore, the vehicle occupant does not feel weighting (acceleration) and the ride quality is improved. At the same time, an inconvenience that the actual stop position is displaced because the host vehicle moves relative to the vehicle stop position can be prevented.

In addition, the target speed setting unit is preferably configured to set a plurality of jerks each corresponding to a rate of change of acceleration or the deceleration of the host vehicle, calculate speeds in accordance with the plurality of jerks, and obtain the target speed among the speeds, and if the relative distance is more than the determination threshold, the setting range of the plurality of jerks whose lower limit is a target jerk value at which the jerk is converged to zero is preferably set.

The vehicle control device can calculate the target speed for weakening the degree of the deceleration of the host vehicle in more detail by setting the setting range of the plurality of jerks whose lower limit is the target jerk value at which the jerk is converged to zero.

In addition, the target speed setting unit may be configured to set a plurality of jerks each corresponding to a rate of change of acceleration or the deceleration of the host vehicle, calculate speeds in accordance with the plurality of jerks, and obtain the target speed among the speeds, and if the relative distance is less than or equal to the determination threshold, the setting range of the plurality of jerks may be set around a target jerk value at which the jerk is converged to zero.

The vehicle control device can easily control to stop the vehicle with no acceleration applied to the vehicle occupant near the vehicle stop position by setting the setting range of the plurality of jerks around the target jerk value.

Here, the vehicle stop position can be classified into stops based on a traffic light stop line where a traffic light is provided, a temporary stop line, and a preceding vehicle, and the target speed setting unit may be configured to choose whether or not to perform correction of the target speed, or configured to differentiate a correction amount, on a basis of information about the traffic light stop line, the temporary stop line, or the preceding vehicle.

In this manner, the stop control for the host vehicle can be changed in accordance with the stop target by choosing whether to perform the correction of the target speed or differentiating the correction amount on the basis of the information about the traffic light stop line, the temporary stop line, or the preceding vehicle, and thus, the host vehicle can be controlled to stop more suitably in accordance with the traffic circumstance.

Alternatively, the vehicle stop position detection unit may be configured to add information about reliability to the detected vehicle stop position, and the target speed setting unit may be configured not to perform correction of the target speed if the reliability is low, and may be configured to perform the correction of the target speed if the reliability is high.

By not performing the correction of the target speed if the reliability is low, stopping the host vehicle in accordance with the vehicle stop position that is presumed to include the error can be suppressed.

According to the present invention, the vehicle control device can predict the actual stop position of the vehicle with respect to the vehicle stop position, and by changing the content of the deceleration of the vehicle in accordance with the predicted circumstance, stop the vehicle more accurately at the vehicle stop position.

BRIEF DESCRIPTION OF DRAWINGS

FIG. 18A is an explanatory diagram showing whether to perform change of the deceleration mode on the basis of an object of the vehicle stop position, and FIG. 18B is an explanatory diagram showing whether to perform the change of the deceleration mode on the basis of the reliability of external environment recognition information.

DESCRIPTION OF EMBODIMENT

A preferred embodiment of a vehicle control device according to the present invention is hereinafter described in detail with reference to the attached drawings.

Figure 1:
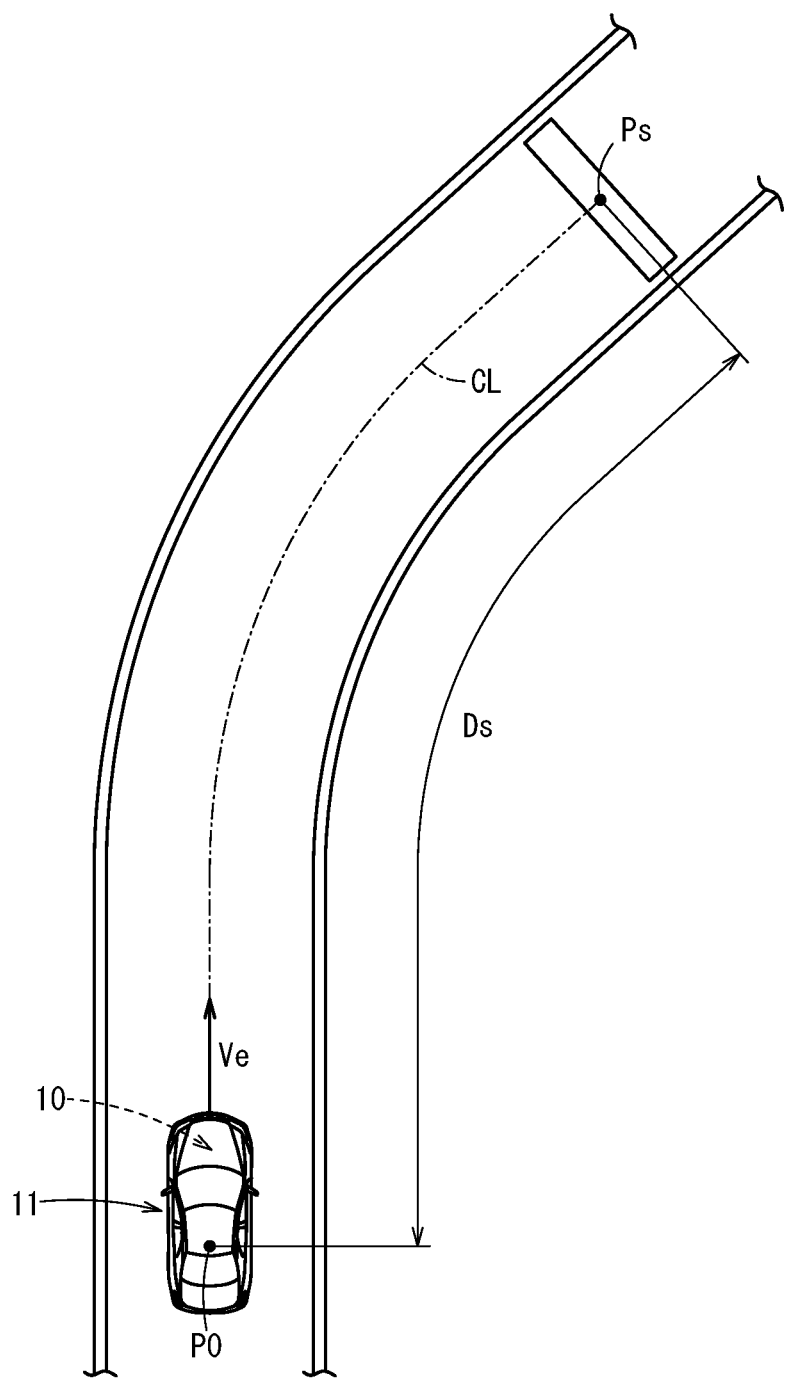
FIG. 1 is a plan view for describing an operation in which a vehicle including a vehicle control device according to one embodiment of the present invention stops at a vehicle stop position.

A vehicle control device 10 according to one embodiment of the present invention is mounted in a vehicle 11 (hereinafter also referred to as host vehicle 11) as illustrated in FIG. 1, and controls automated driving of the host vehicle 11. In the automated driving, speed control of adjusting the vehicle speed of the host vehicle 11 (for example, accelerating, decelerating, or keeping speed), and steering control of adjusting a traveling direction of the host vehicle 11 are integrally performed.

Moreover, in the automated driving, the vehicle control device 10 performs stop control of detecting a vehicle stop position Ps ahead of the host vehicle 11 in the traveling direction and decelerating and stopping the host vehicle 11 in accordance with this vehicle stop position Ps. In particular, even if the detection of the vehicle stop position Ps is insufficient, this vehicle control device 10 can decelerate preliminarily when the vehicle speed of the host vehicle 11 is high. Thus, the vehicle control device 10 can stably stop the host vehicle 11 at the vehicle stop position Ps, and additionally reduce the acceleration applied on a vehicle occupant as much as possible in accordance with the circumstance.

Note that "vehicle stop position Ps" corresponds to a target position for stop that is set by the host vehicle 11 for safety in a travel path. For example, the vehicle stop position Ps is set in a manner that the vehicle control device 10 detects a stop line, a traffic light (traffic light stop line), a sign, a railroad crossing, a construction site, a guide light, or the like in the travel path and determines whether the detected object is the object where the host vehicle 11 should stop. In addition, the vehicle stop position Ps may be set for a traffic participant such as an obstacle (including parked or stopped vehicle), another vehicle, or a person existing ahead of the host vehicle 11 in the traveling direction. Hereinafter, the stop line on a road is described as an example of the vehicle stop position Ps.

[Overall Configuration of Host Vehicle 11]

Figure 2:
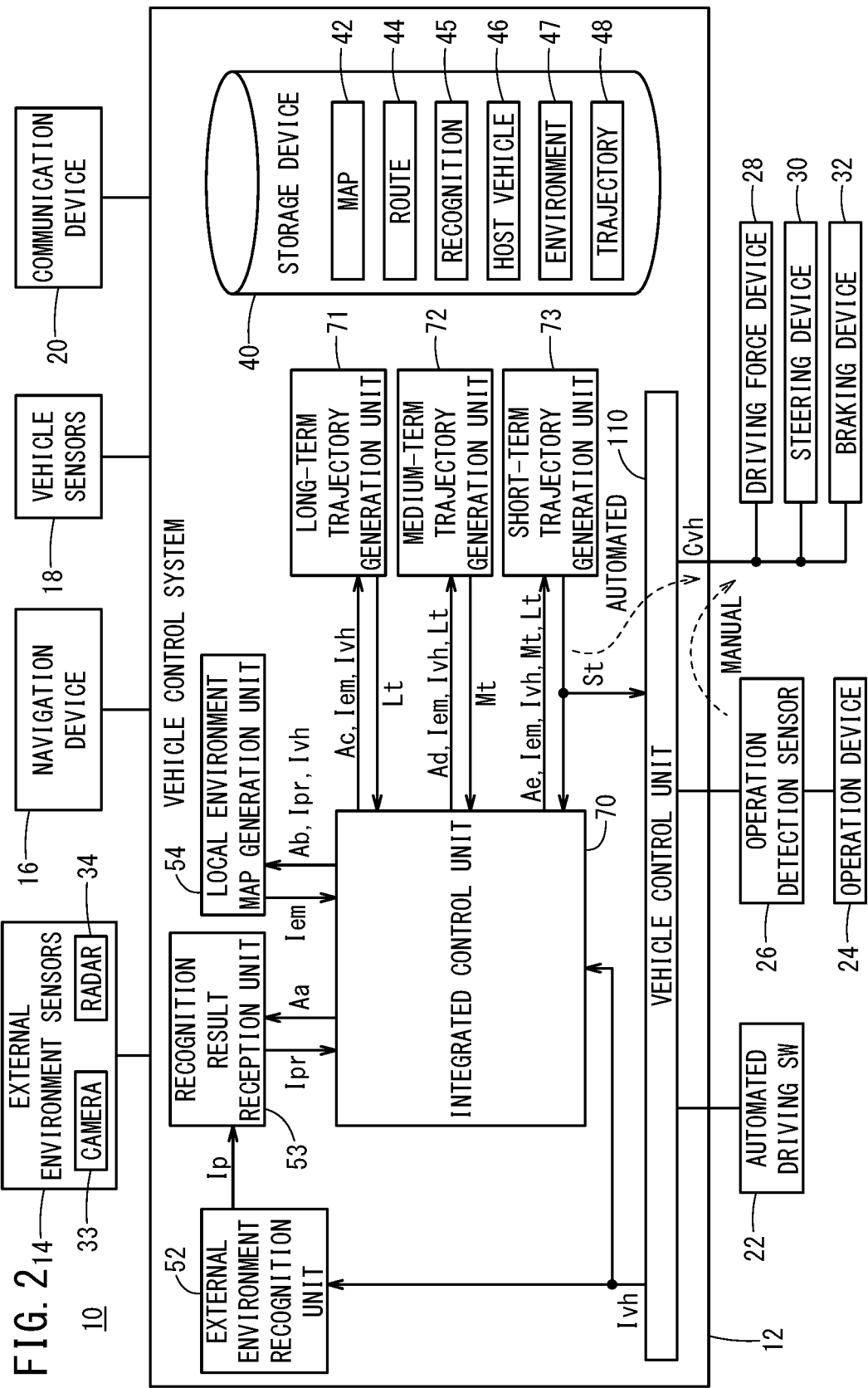
FIG. 2 is a schematic configuration block diagram of the vehicle control device in FIG. 1.

As illustrated in FIG. 2, the vehicle control device 10 includes a vehicle control system 12 (electronic control unit) corresponding to a main part of a system that performs a process when the host vehicle 11 travels, and the vehicle control device 10 moreover includes an input device and an output device that are connected to the vehicle control system 12 through a communication line. The input device includes external environment sensors 14, a navigation device 16, vehicle sensors 18, a communication device 20, an automated driving switch 22 (automated driving SW), an operation detection sensor 26, and the like. The output device includes a driving force device 28, a steering device 30, a braking device 32, and the like.

The external environment sensors 14 make a sensor device group (vehicle stop position detection unit) that recognizes a circumstance outside the host vehicle 11, and in the present embodiment, includes one or more cameras 33 and one or more radars 34. The cameras 33 and the radars 34 detect an external environment in accordance with their characteristics, and output detection information based on this detection to the vehicle control system 12. The external environment sensor 14 may be formed by one kind of device or may include another device. Examples of the other device include an infrared ray sensor, an ultrasonic sensor, and a LIDAR (optical detection device).

The navigation device 16 detects and specifies the current position of the host vehicle 11 using a satellite positioning device or the like, and calculates a route from the current position to a destination specified by the user. The information from the navigation device 16 (map information, current position, calculated route, or the like) is provided to the vehicle control system 12 as necessary, and stored in a map information storage unit 42 or a route information storage unit 44 of a storage device 40.

The vehicle sensors 18 make a sensor device group (vehicle state detection unit, vehicle speed detection unit) that detects the state of the host vehicle 11 and outputs a detection result to the vehicle control system 12 in the travel of the host vehicle 11, for example. This sensor device group includes a vehicle speed sensor that detects the vehicle speed of the host vehicle 11, an acceleration sensor that detects the acceleration, a yaw rate sensor that detects the angular velocity around a vertical axis of the host vehicle 11, an azimuth sensor that detects the direction of the host vehicle 11, an inclination sensor that detects the inclination of the host vehicle 11, and the like. The detection information detected by the vehicle sensors 18 is stored as host vehicle state information Ivh in a host vehicle state information storage unit 46 of the storage device 40.

The communication device 20 is provided to communicate with an external communication device (a road-side device, another vehicle, a server, or the like) existing outside the host vehicle 11. For example, the communication device 20 receives information regarding a traffic light (position, color) from the road-side device, probe information regarding the other vehicle from the other vehicle, updated map information from the server, or other information, and transmits the probe information about the host vehicle 11 and the like to the outside.

The automated driving switch 22 is a switch for a driver to change between a manual driving mode and an automated driving mode. In the manual driving mode, the driver operates an operation device 24 of the host vehicle 11 so as to operate the output device (the driving force device 28, the steering device 30, the braking device 32) to make the host vehicle 11 travel, for example.

Examples of the operation device 24 include an accelerator pedal, a steering wheel (handle), a brake pedal, a shift lever, and a direction indicating lever. Each structure of the operation device 24 is provided with the operation detection sensor 26 that detects whether the driver's operation is performed, the operation amount, or an operation position. Each operation detection sensor 26 outputs to the vehicle control system 12, the accelerator stepping amount (accelerator opening), the handle operation (steering) amount, the brake stepping amount, a shift position, a right/left turning direction, or the like as a detection result. This detection result is provided as the host vehicle state information Ivh to an external environment recognition unit 52 through a vehicle control unit 110.

In the automated driving mode, the host vehicle 11 travels, for example, under control of the vehicle control device 10 in a state where the driver does not operate the operation device 24. While the automated driving mode is performed, the vehicle control system 12 generates an action plan (a long-term trajectory, a medium-term trajectory, a short-term trajectory to be described below) on the basis of a peripheral environment of the host vehicle 11 and along this action plan, controls the output device (the driving force device 28, the steering device 30, the braking device 32) as appropriate.

The driving force device 28 includes a driving force ECU, and a driving source including an engine or a traction motor that are not shown. The driving force device 28 generates travel driving force (torque) in accordance with a vehicle control value Cvh that is output from the vehicle control system 12, and transmits the travel driving force to wheels through a transmission (or directly).

The steering device 30 includes an EPS (electric power steering) ECU and an EPS device that are not shown. The steering device 30 changes the direction of the wheels (steering wheels) in accordance with the vehicle control value Cvh that is input from the vehicle control system 12.

For example, the braking device 32 is an electric servo brake that is used in combination with a hydraulic brake, and includes a brake ECU and a brake actuator that are not shown. The braking device 32 brakes the wheels in accordance with the vehicle control value Cvh that is input from the vehicle control system 12.

[Configuration of Vehicle Control System 12]

The vehicle control system 12 is configured as an electronic control unit (ECU) including a processor and an input/output interface, which are not shown, and the storage device 40 as hardware, and internally forms a plurality of function achievement units. Specifically, the vehicle control system 12 includes the external environment recognition unit 52, a recognition result reception unit 53, a local environment map generation unit 54, an integrated control unit 70 (task synchronizing module), a long-term trajectory generation unit 71, a medium-term trajectory generation unit 72, a short-term trajectory generation unit 73, and the vehicle control unit 110. Note that, in the present embodiment, the function achievement unit is a software function unit configured in a manner that a processor executes programs stored in the storage device 40. However, the function achievement unit may be achieved alternatively by a hardware function unit including an integrated circuit or the like.

The external environment recognition unit 52 extracts an object existing outside the host vehicle 11 using each detection information input from the external environment sensor 14, the navigation device 16, the communication device 20, and the like, and generates information as an external environment recognition result (hereinafter referred to as external environment recognition result Ip). When the external environment recognition result Ip is generated, a relative positional relation of the object with respect to the host vehicle 11 (direction or distance of host vehicle 11 with respect to object) is also recognized with reference to the detection result from the radars 34 or the like, the host vehicle state information Ivh transmitted from the vehicle sensors 18 or a vehicle control unit 74, and the like. Here, the external environment recognition unit 52 may recognize the relative positional relation by disposing the extracted object in a virtual two-dimensional plane (host vehicle coordinate system) based on the host vehicle 11.

For example, the external environment recognition unit 52 extracts the object such as a lane mark (while line or the like), a guard rail, a curbstone, a stop line, a traffic light (traffic light stop line), a sign, an obstacle, or a traffic participant on the road where the host vehicle 11 travels, on the basis of image information from the cameras 33. Here, the object that defines the travel path, for example the lane mark (white line or the like), the guard rail, or the curbstone, can be said as static information that does not change in a short period. On the other hand, the obstacle and the traffic participant can be said as dynamic information that changes in a short period. The stop line, the traffic light, or the like installed in the travel path changes whether to stop the vehicle in accordance with the peripheral environment or change over time. Therefore, the vehicle control device 10 according to the present embodiment treats such information as dynamic information.

The recognition result reception unit 53 constantly receives the external environment recognition result Ip, which is recognized by the external environment recognition unit 52, and updates the old information. At a timing of receiving a calculation instruction Aa from the integrated control unit 70, the recognition result reception unit 53 transmits the external environment recognition result Ip as external environment recognition information Ipr to the integrated control unit 70. This external environment recognition information Ipr can treat each object extracted in the external environment recognition result Ip as individual or integrated information, and is stored in an external environment recognition information storage unit 45 of the storage device 40.

The local environment map generation unit 54 calculates a route where the host vehicle 11 travels on the basis of the external environment recognition information Ipr and the host vehicle state information Ivh, and generates local environment map information Iem. The local environment map generation unit 54 receives a calculation instruction Ab and the external environment recognition information Ipr from the integrated control unit 70 at an appropriate timing, and performs calculation for acquiring the local environment map information Iem. The local environment map information Iem is stored in a local environment map information storage unit 47 of the storage device 40.

For example, the local environment map information Iem includes left and right border line information expressing a travel possible area on both sides of the host vehicle 11, center line information expressing a center of the left and right border line information (center position in width direction), ideal route information where the host vehicle 11 can travel with comfort, and the like. The left and right border line information, the center line information, and the ideal route information may be generated as a point sequence including coordinate points that are dispersedly arranged in a two-dimensional plane. Thus, correlation with the object of another external environment recognition information Ipr becomes easy and the process load on the vehicle control system 12 is reduced. In addition, the local environment map information Iem includes dynamic information of the external environment recognition information Ipr (such as stop line, traffic light stop line, obstacle, or traffic participant). This dynamic information may be, for example, information of a coordinate point or a line segment connecting a plurality of coordinate points in accordance with each piece of the information formed as the point sequence. Thus, the process load in generating a trajectory to be described below is reduced.

The integrated control unit 70 synchronizes the tasks (process operations) of the recognition result reception unit 53, the local environment map generation unit 54, the long-term trajectory generation unit 71, the medium-term trajectory generation unit 72, and the short-term trajectory generation unit 73, and provides information necessary in calculation to each function achievement unit. The integrated control unit 70 counts a reference calculation cycle on the inside, outputs a calculation instruction to each function achievement unit in accordance with the timing based on this reference calculation cycle to perform the process, and receives a process result.

On the other hand, the long-term trajectory generation unit 71, the medium-term trajectory generation unit 72, and the short-term trajectory generation unit 73 each generate the trajectory including the vehicle speed necessary for the speed control of the host vehicle 11 and the route necessary for the steering control of the host vehicle 11 under the instruction from the integrated control unit 70. The long-term trajectory generation unit 71 generates a long-term trajectory Lt corresponding to a trajectory for a relatively long period (for example, 10 seconds) in the travel of the host vehicle 11. The medium-term trajectory generation unit 72 generates a medium-term trajectory Mt corresponding to a trajectory for a period (for example, 5 seconds) shorter than that of the long-term trajectory Lt. The short-term trajectory generation unit 73 generates a short-term trajectory St corresponding to a trajectory for a period (for example, 1 second) shorter than that of the medium-term trajectory Mt.

More specifically, the long-term trajectory generation unit 71 generates the long-term trajectory Lt on the basis of a calculation instruction Ac, the local environment map information Iem, the host vehicle state information Ivh, and the like that are output from the integrated control unit 70. The long-term trajectory Lt is a point sequence expressing a long-term travel target in view of the ride quality (avoiding sudden turn of steering wheel, sudden acceleration or deceleration, and the like) mainly on the basis of the left and right border line information, the center line information, and the ideal route information in the local environment map information Iem. This long-term trajectory Lt is calculated as the information including a plurality of coordinate points, and the time distance of the long-term trajectory Lt is longer than that of the medium-term trajectory Mt.

For example, the long-term trajectory generation unit 71 generates the long-term trajectory Lt in which coordinate points including time or speed information in a 10-second period are arranged at an interval of about several hundreds of milliseconds (9 times reference calculation cycles), and outputs the generated long-term trajectory Lt to the integrated control unit 70. This long-term trajectory Lt is stored in a trajectory information storage unit 48 of the storage device 40.

The medium-term trajectory generation unit 72 (target speed setting unit) generates the medium-term trajectory Mt on the basis of a calculation instruction Ad, the local environment map information Iem, the host vehicle state information Ivh, and the long-term trajectory Lt that are output from the integrated control unit 70. The medium-term trajectory Mt is calculated as the point sequence including the dynamic information included in the local environment map information Iem additionally in order to show the travel target suitable to the circumstance around the host vehicle 11 after several seconds.

For example, if the external environment recognition unit 52 has found a parked vehicle (dynamic information) ahead of the host vehicle 11 in the traveling direction thereof, the host vehicle 11 avoids the contact with the parked vehicle on the basis of the medium-term trajectory Mt generated by the medium-term trajectory generation unit 72 and the short-term trajectory St generated by the short-term trajectory generation unit 73. In addition, the medium-term trajectory generation unit 72 also serves as a function unit of, upon detection of the vehicle stop position Ps, calculating the trajectory for stopping the host vehicle 11 in accordance with the vehicle stop position Ps (see FIG. 1). This configuration will be described below.

For example, the medium-term trajectory generation unit 72 generates the medium-term trajectory Mt in which coordinate points including time or speed information in a 5-second period are arranged at an interval of about one hundred and several tens of milliseconds (3 times reference calculation cycles), and outputs the generated medium-term trajectory Mt to the integrated control unit 70. This medium-term trajectory Mt is stored in the trajectory information storage unit 48 of the storage device 40.

The short-term trajectory generation unit 73 (target speed setting unit) generates the short-term trajectory St on the basis of a calculation instruction Ae, the local environment map information Iem, the host vehicle state information Ivh, the long-term trajectory Lt, and the medium-term trajectory Mt that are output from the integrated control unit 70. The short-term trajectory St is calculated as the point sequence whose time distance is the shortest, and therefore, is applicable to the vehicle dynamics of the host vehicle 11. Accordingly, each coordinate point in the short-term trajectory St includes a position x in a longitudinal direction, a position y in a lateral direction, an attitude angle θz, a speed vs, an acceleration va, a steering angle δst, and the like.

For example, the short-term trajectory generation unit 73 calculates the coordinate points including the information of the vehicle dynamics in a 1-second period at an interval of about several milliseconds (reference calculation cycle), and thus generates the short-term trajectory St. This short-term trajectory St is directly transmitted to the vehicle control unit 110 and is used in the travel control of the host vehicle 11 by the vehicle control unit 110. In addition, the short-term trajectory generation unit 73 also outputs the generated short-term trajectory St to the integrated control unit 70. This short-term trajectory St is stored in the trajectory information storage unit 48 of the storage device 40.

On the other hand, the vehicle control unit 110 converts the coordinate point including the vehicle dynamics into the vehicle control value Cvh so that the host vehicle 11 travels along the input short-term trajectory St, and outputs the vehicle control value Cvh to the driving force device 28, the steering device 30, and the braking device 32.

[Configuration of Performing Stop Control]

Back to FIG. 1, when the external environment recognition unit 52 (see FIG. 2) has detected the vehicle stop position Ps in the travel of the host vehicle 11, the vehicle control device 10 according to the present embodiment performs the stop control of stopping the host vehicle 11 in accordance with the vehicle stop position Ps. To perform this stop control, the function achievement unit for the stop control is formed in each of the external environment recognition unit 52, the medium-term trajectory generation unit 72, and the short-term trajectory generation unit 73.

Figure 3:
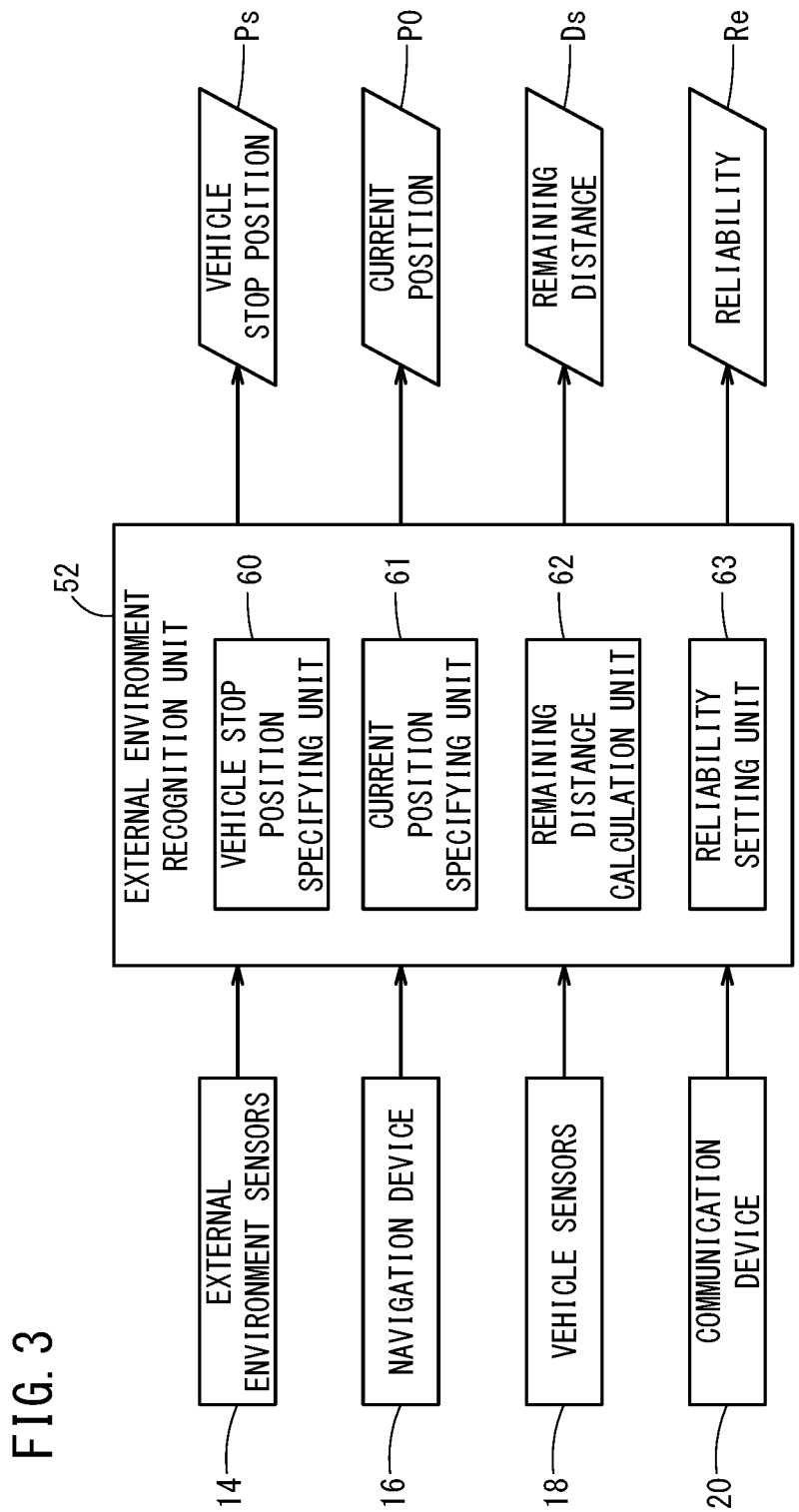
FIG. 3 is a block diagram illustrating a configuration of an external environment recognition unit in stop control.

As illustrated in FIG. 3, in the stop control, the external environment recognition unit 52 provides various pieces of data (external environment recognition information Ipr) for generating the trajectory to decelerate the host vehicle 11 in the medium-term trajectory generation unit 72 and the short-term trajectory generation unit 73. Therefore, the external environment recognition unit 52 includes a vehicle stop position specifying unit 60, a current position specifying unit 61, a remaining distance calculation unit 62, and a reliability setting unit 63 and generates data of the vehicle stop position Ps, a current position P0, a remaining distance Ds (also see FIG. 1), and reliability Re. These pieces of data (external environment recognition result Ip) are output to the local environment map generation unit 54 through the integrated control unit 70.

The vehicle stop position specifying unit 60 specifies as the vehicle stop position Ps, the object at which the host vehicle 11 needs to stop at current time, for example, the stop line or a red traffic light, from the detection information (image information or detection signal) detected by the external environment sensor 14. The vehicle stop position Ps is made into data as the coordinate point of the center position in the width direction of the left and right lane marks that are extracted separately in the two-dimensional plane based on the host vehicle 11.

The current position specifying unit 61 specifies the current position P0 of the host vehicle 11 (relative position with respect to the specified object) in the two-dimensional plane from the detection information detected by the external environment sensor 14, the host vehicle state information Ivh detected by the vehicle sensors 18, and the like. Note that when the current position P0 of the host vehicle 11 is specified, the correction may be performed using the map information in the navigation device 16 or the information of the current position, or the map information or the information of the current position may be used directly.

The remaining distance calculation unit 62 calculates the remaining distance Ds for the host vehicle 11 to reach the vehicle stop position Ps on the basis of the current position P0 and the vehicle stop position Ps that has been specified. When the remaining distance Ds is calculated, the curvature of the road is taken into consideration on the basis of the information of the extracted lane mark. Thus, the remaining distance Ds is calculated not by a simple straight distance between the vehicle stop position Ps and the current position P0 but by the value along the road shape.

The reliability setting unit 63 sets the high and low of the reliability of the information as the degree (reliability Re) regarding the vehicle stop position Ps, the current position P0, and the remaining distance Ds in the external environment recognition information Ipr that is specified in the above configuration. The setting of the reliability Re will be described below in detail.

On the other hand, the local environment map generation unit 54 generates the left and right border line information, the center line information, and the ideal route information so that the generated information includes the aforementioned data (vehicle stop position Ps, current position P0, remaining distance Ds, and reliability Re). This local environment map information Iem is transmitted to the medium-term trajectory generation unit 72 and the short-term trajectory generation unit 73 so as to be used in generating the stop trajectory (medium-term stop trajectory, short-term stop trajectory) for performing the stop control.

Figure 4:
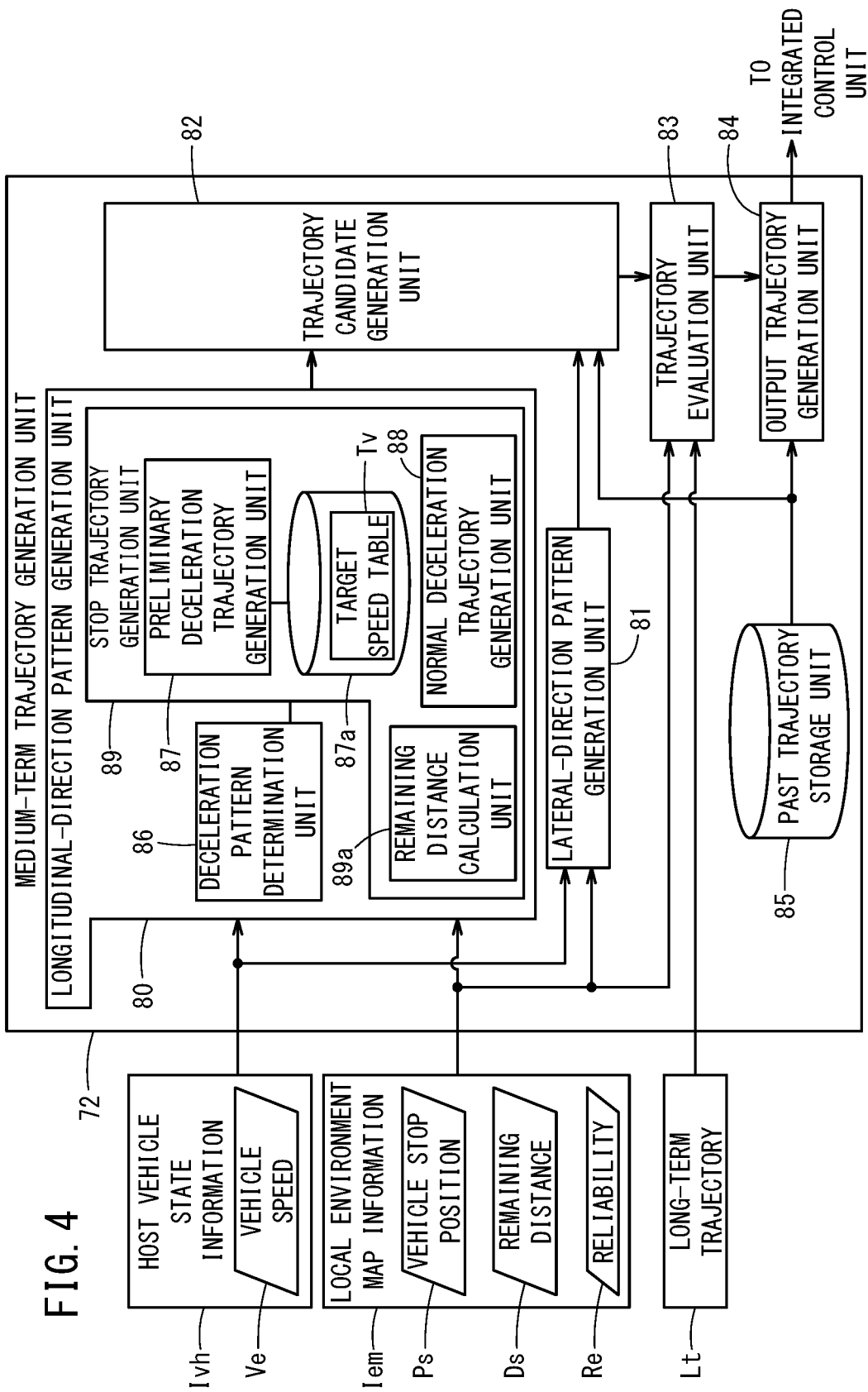
FIG. 4 is a block diagram illustrating a configuration of a medium-term trajectory generation unit in the stop control.

Therefore, as illustrated in FIG. 4, the medium-term trajectory generation unit 72 includes a longitudinal-direction pattern generation unit 80, a lateral-direction pattern generation unit 81, a trajectory candidate generation unit 82, a trajectory evaluation unit 83, an output trajectory generation unit 84, and a past trajectory storage unit 85. The past trajectory storage unit 85 stores the medium-term trajectory Mt calculated in the past (including at least the medium-term trajectory Mt output in the previous calculation). Moreover, to the medium-term trajectory generation unit 72, the long-term trajectory Lt generated by the long-term trajectory generation unit 71 is input in addition to the host vehicle state information Ivh and the local environment map information Iem.

In the automated driving, the longitudinal-direction pattern generation unit 80 generates a trajectory pattern related to the change of the coordinate points over time in a front-back direction along a center axis in the width direction (long-axis direction of vehicle) of the host vehicle 11, that is, mainly related to the vehicle speed. This longitudinal-direction pattern generation unit 80 calculates a plurality of trajectory patterns using the host vehicle state information Ivh and the local environment map information Iem independently of the long-term trajectory Lt or the past trajectory. When the medium-term stop trajectory is generated, a deceleration pattern determination unit 86 and a stop trajectory generation unit 89 including a preliminary deceleration trajectory generation unit 87 (preliminary deceleration setting unit) and a normal deceleration trajectory generation unit 88 (normal deceleration setting unit) are formed. Inside the stop trajectory generation unit 89, a remaining distance calculation unit 89a is provided. The remaining distance calculation unit 89a corrects the remaining distance Ds of the local environment map information Iem to generate the more accurate remaining distance.

In the conventional stop control as described above, when the vehicle stop position Ps is detected accurately, the control is performed to stop the host vehicle 11 in accordance with the vehicle stop position Ps. However, if the vehicle speed of the host vehicle 11 is high when the vehicle stop position Ps is detected accurately, it may be difficult to stop the host vehicle 11 (or sudden braking may be performed) at the vehicle stop position Ps.

In contrast to this, the vehicle control device 10 according to the present embodiment performs the preliminary deceleration even if the reliability Re of the detected vehicle stop position Ps is low; thus, the host vehicle 11 stops smoothly at the vehicle stop position Ps. Therefore, the deceleration pattern determination unit 86 of the longitudinal-direction pattern generation unit 80 determines which one of the preliminary deceleration trajectory generation unit 87 and the normal deceleration trajectory generation unit 88 in the stop trajectory generation unit 89 to operate on the basis of the reliability Re included in the local environment map information Iem.

Figure 5:
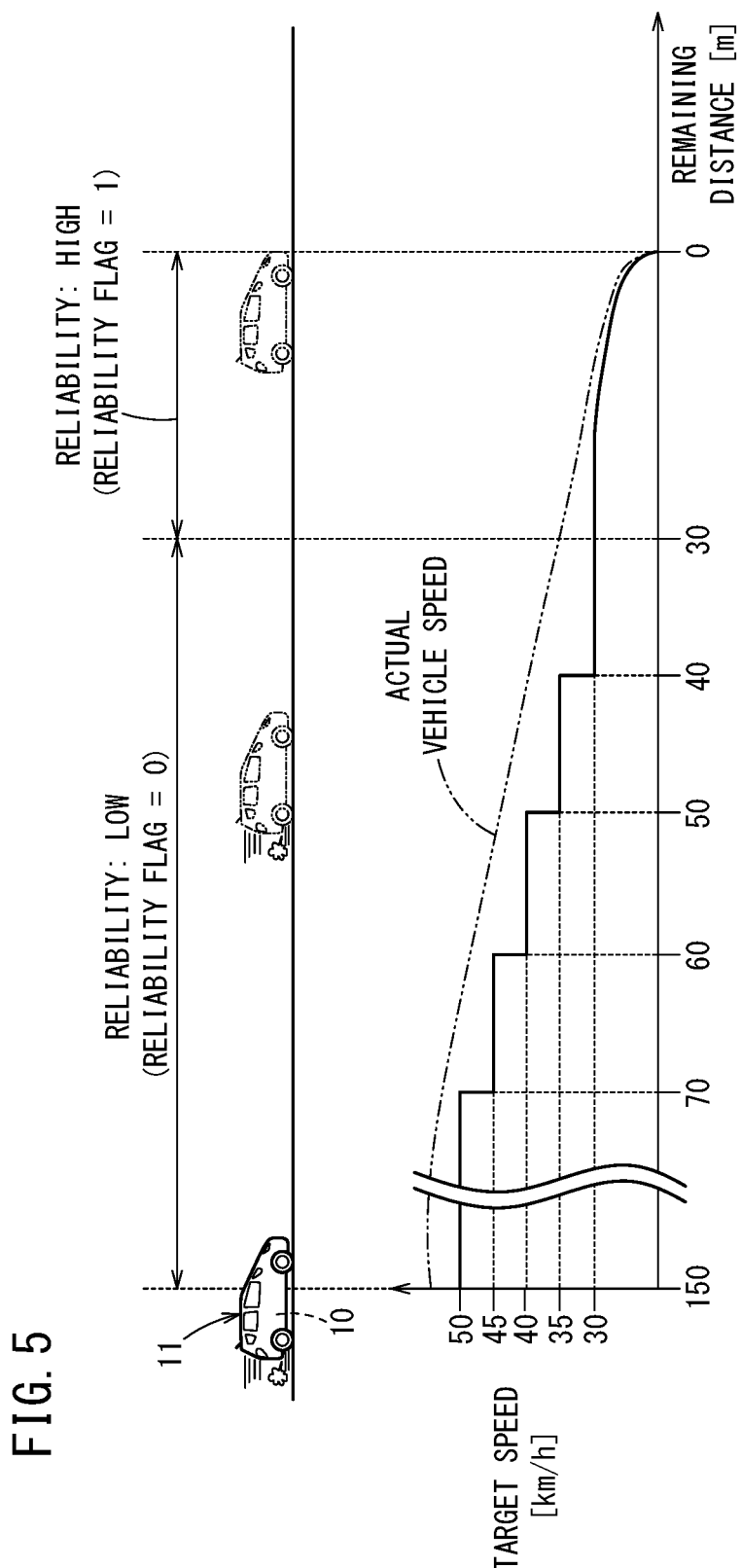
FIG. 5 is an explanatory diagram showing a relation between a remaining distance and a target speed on the basis of reliability in the stop control.

For example, as illustrated in FIG. 5, the reliability Re of the local environment map information Iem (vehicle stop position Ps, current position P0, or remaining distance Ds) becomes lower when the remaining distance Ds to the vehicle stop position Ps is 30 m or more and higher when the remaining distance Ds is less than 30 m. In this case, in the range where the reliability Re is low (in the illustrated example, section where remaining distance Ds is 30 m or more), the deceleration pattern determination unit 86 selects the preliminary deceleration trajectory generation unit 87.

The preliminary deceleration trajectory generation unit 87 calculates a longitudinal-direction pattern (preliminary medium-term stop trajectory) for preliminarily decelerating the host vehicle 11 with respect to the detected vehicle stop position Ps. In the generation of the preliminary medium-term stop trajectory, the target speed changing in accordance with the remaining distance Ds is set by a setting method that is determined in advance. In the present embodiment, as the setting method that is determined in advance, a target speed table Tv in which the target speed is correlated (linked) with every predetermined interval of the remaining distance Ds is referred to. This target speed table Tv is stored in advance in a target speed table storage unit 87a of the medium-term trajectory generation unit 72 (storage device 40), and is read out when the preliminary deceleration trajectory generation unit 87 is in operation.

In the target speed table Tv, the higher vehicle speed is correlated as the remaining distance Ds is longer, and the lower vehicle speed is correlated as the remaining distance Ds is shorter. The target speed table Tv is a speed map in which the target speed when the host vehicle 11 decelerates is varied stepwise in accordance with the remaining distance Ds, that is, the target speed is gradually decreased as the remaining distance Ds becomes shorter. In this manner, since the target speed is stepwise with respect to the remaining distance Ds, performing deceleration when the vehicle speed of the host vehicle 11 is higher than the target speed causes the host vehicle 11 to decelerate smoothly in fact. In addition, an influence from an error in the vehicle stop position Ps is reduced.

For example, in the target speed table Tv in FIG. 5, the target speed is set to 50 km/h when the remaining distance Ds is 70 m or more, 45 km/h when the remaining distance Ds is 70 to 60 m, 40 km/h when the remaining distance Ds is 60 to 50 m, 35 km/h when the remaining distance Ds is 50 to 40 m, and 30 km/h when the remaining distance Ds is 40 m or less. The target speed table Tv may be designed so that the target speed decreases stepwise with respect to the remaining distance Ds and moreover the target speed decreases gradually (continuously) in accordance with the remaining distance Ds. In the setting method for the target speed in the preliminary deceleration, various methods other than referring to the target speed table Tv can be employed. For example, a calculation formula that can calculate the target speed using the remaining distance Ds as an input parameter may be employed.

The preliminary deceleration trajectory generation unit 87 compares the vehicle speed included in the host vehicle state information Ivh with the target speed that is set once, and if the vehicle speed is higher than the target speed, the preliminary deceleration trajectory generation unit 87 generates the preliminary medium-term stop trajectory in accordance with the target speed in the target speed table Tv. On the other hand, if the vehicle speed of the host vehicle 11 is already lower than the target speed, the preliminary deceleration trajectory generation unit 87 may generate the preliminary medium-term stop trajectory to reduce the braking force and continue the deceleration of the host vehicle 11 (cause the vehicle to travel with inertia). This is because, in the stop control, accelerating the host vehicle 11 to achieve the target speed may result in the decrease in travel efficiency, fuel efficiency, vehicle occupant's comfortability, and the like.

Note that the remaining distance Ds to which the preliminary deceleration trajectory generation unit 87 refers is the distance calculated by the remaining distance calculation unit 89a (distance obtained by correcting the remaining distance Ds of the local environment map information Iem). For example, the remaining distance calculation unit 89a calculates the distance in accordance with the route where the host vehicle 11 travels in fact by using the ideal route information of the local environment map information Iem or the like.

When the host vehicle 11 has moved from the range where the reliability Re is low to the range where the reliability Re is high (in the illustrated example, section where the remaining distance Ds is less than 30 m), the stop trajectory generation unit 89 selects the normal deceleration trajectory generation unit 88 by the deceleration pattern determination unit 86. The normal deceleration trajectory generation unit 88 calculates the longitudinal-direction pattern (normal medium-term stop trajectory) to make the host vehicle 11 decelerate normally with respect to the detected vehicle stop position Ps. In this case, the normal deceleration trajectory generation unit 88 sets the target speed that changes in more detail than the target speed set by the preliminary deceleration trajectory generation unit 87 on the basis of the remaining distance Ds (calculated by the remaining distance calculation unit 89a) and the vehicle speed.

For example, in order to suppress the influence of the slow vehicle speed on the following vehicle, the normal medium-term stop trajectory is set to follow a nonlinear speed change, specifically, to suppress the decrease in speed at a position away from the vehicle stop position Ps to some extent and to decrease the target speed largely near the vehicle stop position Ps.

Here, when the normal medium-term stop trajectory is generated (when the reliability Re has increased), the vehicle speed is low to some extent by the preliminary deceleration performed at the stage where the reliability Re of the external environment recognition information Ipr is low. Therefore, the vehicle control device 10 can generate the normal medium-term stop trajectory easily and stop suitably the host vehicle 11 in accordance with the vehicle stop position Ps. Note that in the case where the reliability Re of the external environment recognition information Ipr is high from the beginning though the vehicle stop position Ps is far from the host vehicle 11, the preliminary deceleration trajectory generation unit 87 is not operated and only the normal deceleration trajectory generation unit 88 is operated. Even in this case, a period for which the vehicle speed is decreased is long; therefore, the host vehicle 11 can be stopped suitably in accordance with the vehicle stop position Ps.

The reliability Re for setting the operation of the preliminary deceleration trajectory generation unit 87 and the normal deceleration trajectory generation unit 88 is set by the reliability setting unit 63 (see FIG. 3) in a process of generating the external environment recognition information Ipr by the external environment recognition unit 52. The reliability setting unit 63 may set the reliability Re as the degree expressed in numerals in the range of 0 at the minimum to 1 at the maximum.

Figure 6:
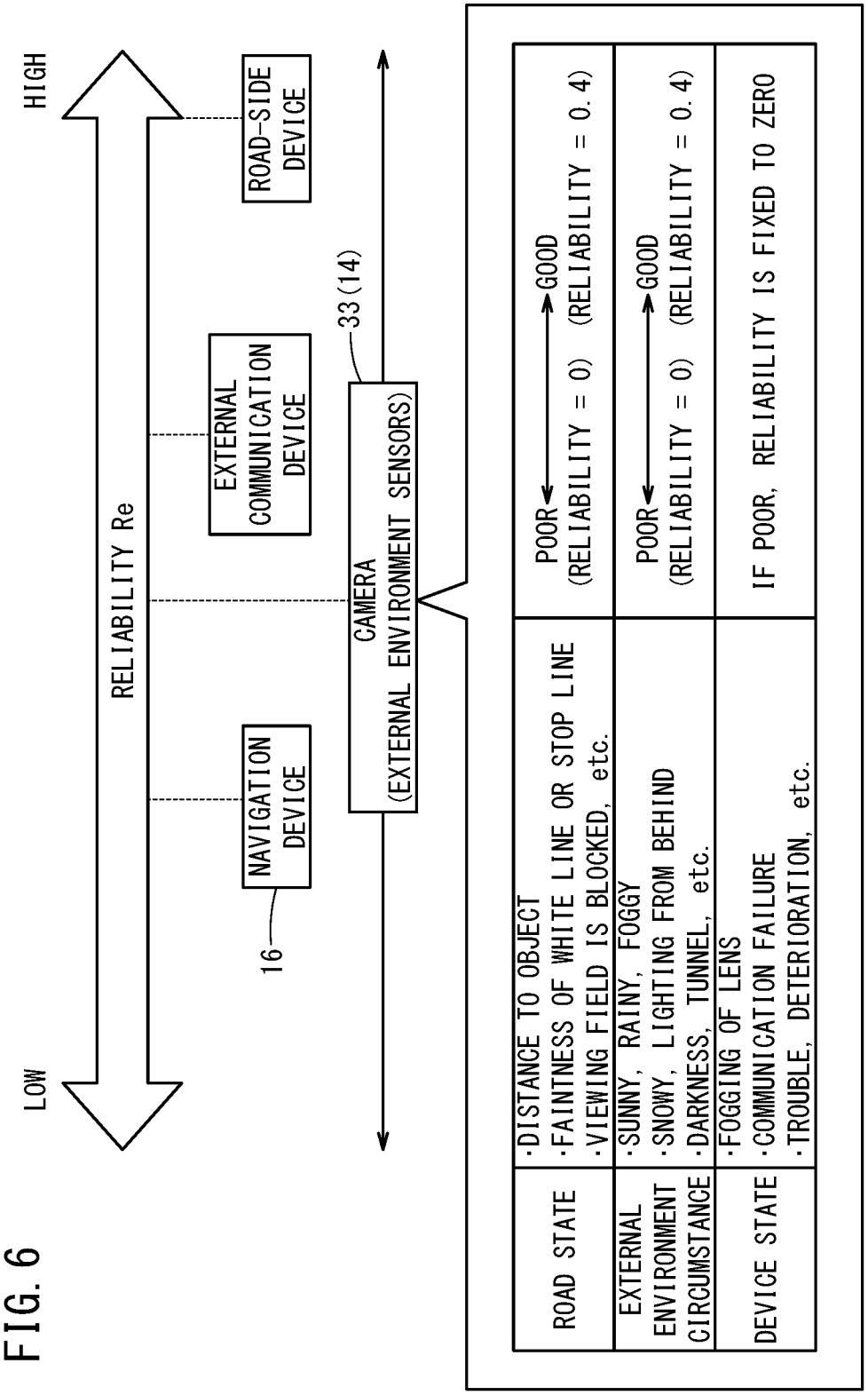
FIG. 6 is an explanatory diagram showing a reliability setting method in the stop control.

In one example illustrated in FIG. 6, the reliability setting unit 63 may assign the numeral of the reliability Re in accordance with the kind of each device acquired by the external environment recognition unit 52. For example, the information acquired from the road-side device provided at the road through the communication device 20 of the host vehicle 11 is highly reliable; therefore, a high numeral (for example, reliability Re=1) is assigned. The information acquired from the external communication device of the other vehicle, the server, or the like through the communication device 20 of the host vehicle 11 is less reliable than that acquired from the road-side device; therefore, a little lower numeral (for example, reliability Re=0.7) is assigned. The information acquired from the navigation device 16 should be regarded as containing a detection error; therefore, a low numeral (for example, reliability Re=0.3) is assigned.

The external environment sensor 14 including the cameras 33 changes in its reliability Re depending on time and place; therefore, the reliability Re may be changed depending on the circumstance. Examples of the factor that changes the reliability Re of the cameras 33 include a road state, an external environment circumstance, and a device state.

In addition, the road state can include elements of the distance from the host vehicle 11 to the object, the state of the white line or the stop line, the visibility of the viewing field by the other vehicle or a plurality of pedestrians, and the like. For example, under the circumstance where the object is far, the white line or the stop line is unclear, or the viewing field is narrow, the reliability Re is set to a low numeral (reliability Re=0). On the contrary, if there is less influence from each element, the reliability Re is a predetermined value (for example, reliability Re=0.4).

The external environment circumstance can include elements such as weather, a sunlight incidence direction, and the ambient brightness. For example, if the weather is rainy, foggy, or snowy or the sunlight is contained in the image, or under a circumstance where the ambient is dark such as in a nighttime or in a tunnel, the reliability Re is set to a low numeral (reliability Re=0). On the contrary, if there is less influence from each element, the reliability Re is the predetermined value (for example, reliability Re=0.4).

The device state can include elements such as whether a lens of the cameras 33 is good, whether a communication state between the cameras 33 and the vehicle control system 12 is good, or whether the cameras 33 are in trouble or have deteriorated. For example, when the lens is unclear, the communication state is not well, or the trouble or deterioration occurs, the reliability Re may be fixed to 0 even if the road state or the external environment circumstance is good.

The above elements are specified by performing various processes of the image information input from the cameras 33 in the external environment recognition unit 52 (for example, comparison with image information from the cameras, comparison with the past image information, evaluation of host vehicle state, evaluation of sharpness of extracted object, evaluation of luminance, evaluation of brightness and darkness, evaluation of image correction amount, detection of trouble or deterioration, or detection of communication state). Note that regarding the road-side device, the external communication device, the navigation device 16, and the like, the reliability Re may be changed in accordance with the kind of information, the instruction from the device, or the communication state.

The reliability setting unit 63 assigns the parameter of the reliability Re resulting from each of the above factors to an equation that is determined in advance, thereby calculating one reliability Re of the external environment recognition result Ip through calculation. In the case where the information is obtained from a plurality of devices of the cameras 33, the navigation device 16, the communication device 20, and the like, one reliability Re is calculated by using the weight (importance) of the information that is set in advance, for example. In one example, in the case where the information from the road-side device and the image information from the cameras 33 are acquired, a weight W1 (for example, W1=0.8) of the information from the road-side device is increased and a weight W2 (for example, W2=1−W1=0.2) of the information from the cameras 33 is decreased so that the reliability Re is set. Note that the weight W2 of the cameras 33 may be increased if the reliability Re based on each of the above elements is high, and the weight W2 may be decreased if the reliability Re based on each of the above elements is low.

The deceleration pattern determination unit 86 (reliability determination unit) illustrated in FIG. 4 receives the reliability Re output from the external environment recognition unit 52, and compares the reliability Re with a reliability determination threshold (not shown) the deceleration pattern determination unit 86 has internally owned in advance. If the received reliability Re is lower than or equal to the reliability determination threshold, a reliability flag is set to 0 and the preliminary deceleration trajectory generation unit 87 is operated. If the received reliability Re is higher than the reliability determination threshold, the reliability flag is set to 1 and the normal deceleration trajectory generation unit 88 is operated. Note that the external environment recognition unit 52 or the local environment map generation unit 54 may include the reliability determination unit, and may output the local environment map information Iem in a manner that the local environment map information Iem includes the reliability flag (0 or 1).

In the automated driving, the lateral-direction pattern generation unit 81 generates a trajectory pattern related to the change of the coordinate point over time in a left or right turning direction that deviates in the left or right direction from the center axis in the width direction of the host vehicle 11, that is, mainly related to steering. This lateral-direction pattern generation unit 81 also calculates a plurality of trajectory patterns in accordance with the steering capability of the host vehicle 11 (handle steering angle) using the host vehicle state information Ivh and the local environment map information Iem independently of the long-term trajectory Lt or the past trajectory.

The trajectory candidate generation unit 82 combines the plurality of longitudinal-direction patterns and the plurality of lateral-direction patterns that are generated, so as to generate a plurality of medium-term trajectory candidates using a simple vehicle model. In this case, the trajectory candidate generation unit 82 calculates the point sequence in which the host vehicle 11 can follow and the coordinate point is timely changed in the local environment map information Iem (in two-dimensional plane) on the basis of the medium-term trajectory Mt in the past stored in the past trajectory storage unit 85. In the stop control, the medium-term stop trajectory combining the longitudinal-direction pattern and the lateral-direction pattern (preliminary medium-term stop trajectory, normal medium-term stop trajectory) is generated.

The trajectory evaluation unit 83 evaluates the plural medium-term trajectory candidates generated by the trajectory candidate generation unit 82 on the basis of the local environment map information Iem and the long-term trajectory Lt, and specifies the medium-term trajectory Mt that is optimal. For example, in the case where the local environment map information Iem includes the dynamic information including the obstacle that the host vehicle 11 should avoid, the trajectory that can avoid the obstacle is evaluated. In another example, if the information that the host vehicle 11 should avoid is not included, the trajectory close to the long-term trajectory Lt among the medium-term trajectory candidates is evaluated.

The output trajectory generation unit 84 selects the optimal medium-term trajectory Mt among the medium-term trajectory candidates evaluated by the trajectory evaluation unit 83, outputs the medium-term trajectory Mt to the integrated control unit 70, and moreover stores the medium-term trajectory Mt in the past trajectory storage unit 85.

[Process Flow of Stop Control]

Figure 7:
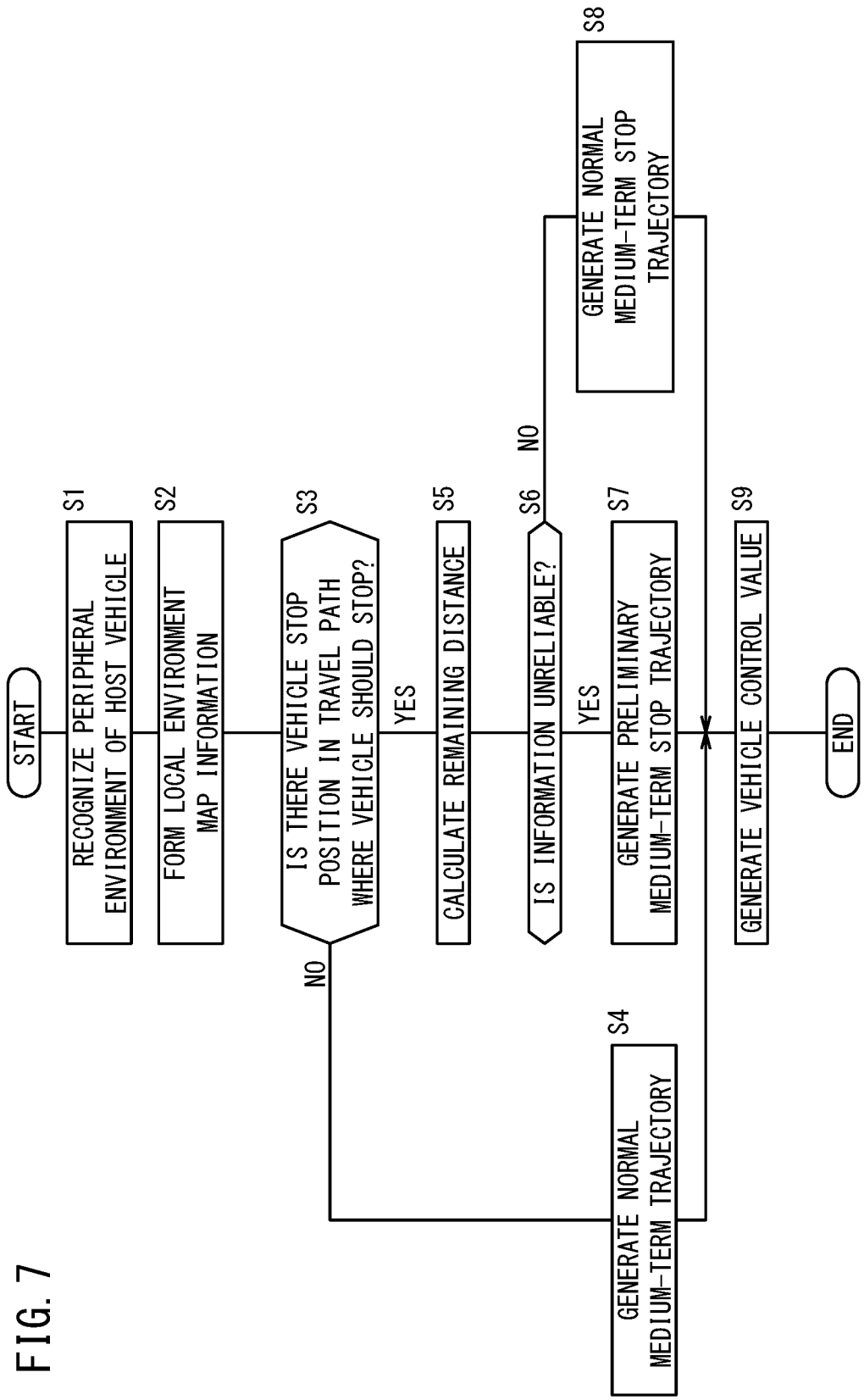
FIG. 7 is a flowchart showing a process flow of the external environment recognition unit and the medium-term trajectory generation unit in the stop control.

Next, a process flow of the external environment recognition unit 52, the local environment map generation unit 54, and the medium-term trajectory generation unit 72 in the stop control is described with reference to FIG. 7. The vehicle control device 10 performs the automated driving control on the basis of the driver's instruction (ON operation of automated driving switch 22, for example) in the travel of the host vehicle 11. In the automated driving control, the external environment sensor 14, the navigation device 16, the communication device 20, or the like detects the peripheral environment of the host vehicle 11, and the external environment recognition unit 52 recognizes the peripheral environment of the host vehicle 11 (step S1).

Next, the local environment map generation unit 54 forms the local environment map information Iem on the basis of the external environment recognition information Ipr output from the recognition result reception unit 53 (external environment recognition unit 52) (step S2). The medium-term trajectory generation unit 72 determines whether there is the vehicle stop position Ps where the vehicle should stop (stop line, traffic light, or the like) in the travel path on the basis of the information of the local environment map information Iem (step S3).

If the vehicle stop position Ps is not detected in step S3, the medium-term trajectory generation unit 72 generates the normal medium-term trajectory Mt in the travel other than the stop control (step S4). At this time, the medium-term trajectory generation unit 72 generates the medium-term trajectory Mt as appropriate by operating the longitudinal-direction pattern generation unit 80, the lateral-direction pattern generation unit 81, the trajectory candidate generation unit 82, the trajectory evaluation unit 83, and the output trajectory generation unit 84 as descried above.

On the other hand, if the vehicle stop position Ps is detected in step S3, the remaining distance calculation unit 89a calculates the remaining distance Ds (step S5). Note that the remaining distance Ds may be the distance included in the local environment map information Iem.

Next, the deceleration pattern determination unit 86 in the medium-term trajectory generation unit 72 determines whether the information is unreliable on the basis of the reliability Re included in the local environment map information Iem (step S6). If it is determined that the information is unreliable (the reliability Re is lower than reliability determination threshold), the preliminary deceleration trajectory generation unit 87 is operated; if it is determined that the information is reliable (the reliability Re is higher than reliability determination threshold), the normal deceleration trajectory generation unit 88 is operated.

In step S7, the preliminary deceleration trajectory generation unit 87 sets the target speed for the remaining distance Ds with reference to the target speed table Tv read out from the target speed table storage unit 87*a*. Then, if current vehicle speed Ve is higher than the target speed, the preliminary medium-term stop trajectory for preliminarily decelerating the host vehicle 11 in accordance with the remaining distance Ds is generated.

On the other hand, in step S8, the normal deceleration trajectory generation unit 88 generates the target speed, that is, the normal medium-term stop trajectory on the basis of the remaining distance Ds and the vehicle speed Ve.

Then, the vehicle control unit 110 generates the vehicle control value Cvh for controlling the output device finally (after acquiring short-term trajectory St) on the basis of the medium-term trajectory Mt generated in step S4, step S7, or step S8, and outputs the vehicle control value Cvh to each configuration in the output device (step S9). Thus, the vehicle control device 10 can perform the stop control of the host vehicle 11 to stop the host vehicle 11 at the vehicle stop position Ps.

[Configuration of Changing Deceleration Mode of Short-Term Trajectory Generation Unit]

Figure 8:
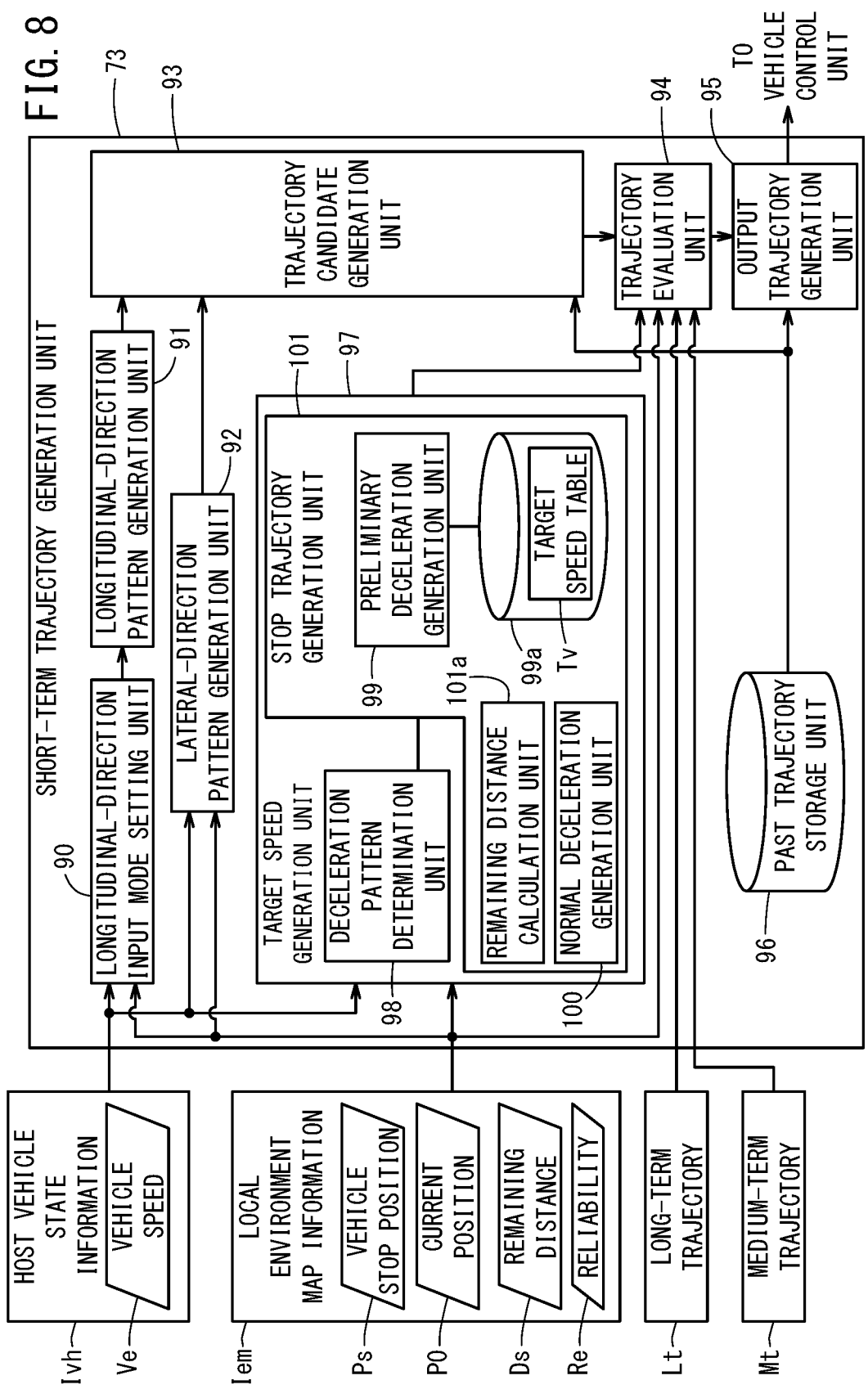
FIG. 8 is a block diagram illustrating a configuration of a short-term trajectory generation unit in the stop control.

In addition, the short-term trajectory generation unit 73 illustrated in FIG. 2 basically has a configuration similar to that of the medium-term trajectory generation unit 72, and by performing the similar process flow, generates the short-term trajectory St with the shorter distance (shorter period) than the medium-term trajectory Mt. As illustrated in FIG. 8, the short-term trajectory generation unit 73 includes a longitudinal-direction input mode setting unit 90, a longitudinal-direction pattern generation unit 91, a lateral-direction pattern generation unit 92, a trajectory candidate generation unit 93, a trajectory evaluation unit 94, an output trajectory generation unit 95, a past trajectory storage unit 96, and a target speed generation unit 97. The past trajectory storage unit 96 stores the short-term trajectory St calculated in the past (including at least the short-term trajectory St output in the previous calculation). In addition, to the short-term trajectory generation unit 73, the long-term trajectory Lt and the medium-term trajectory Mt are input in addition to the local environment map information Iem and the host vehicle state information Ivh.

In the stop control, the longitudinal-direction pattern generation unit 91 generates a plurality of short-term stop trajectories each including the point sequence with a shorter time interval than the medium-term stop trajectory. The longitudinal-direction pattern generation unit 91 generates different trajectories in accordance with some circumstances set by the longitudinal-direction input mode setting unit 90. This configuration will be described below. On the other hand, the trajectory candidate generation unit 93 generates the trajectory candidates (short-term stop trajectories in stop control) on the basis of the longitudinal-direction pattern from the longitudinal-direction pattern generation unit 91 and the lateral-direction pattern from the lateral-direction pattern generation unit 92.

The short-term trajectory generation unit 73 is provided with the target speed generation unit 97 in order to generate the speed information that is used to evaluate the trajectory candidates generated by the trajectory candidate generation unit 93. That is to say, the short-term trajectory St is the trajectory that directly influences the control of the host vehicle 11, and when the short-term trajectory St is set after being evaluated on the basis of the speed information of the target speed generation unit 97, the speed of the host vehicle 11 can be adjusted accurately.

The target speed generation unit 97 generates the speed information (preliminary deceleration, normal deceleration) as appropriate for stopping the host vehicle 11 at the vehicle stop position Ps in accordance with the reliability Re in the stop control in a manner similar to the medium-term trajectory generation unit 72. Therefore, inside the target speed generation unit 97, a stop trajectory generation unit 101 including a deceleration pattern determination unit 98, a preliminary deceleration generation unit 99, and a normal deceleration generation unit 100 is formed.

The deceleration pattern determination unit 98 of the target speed generation unit 97 determines the operation of the preliminary deceleration generation unit 99 and the normal deceleration generation unit 100 on the basis of the reliability Re. The preliminary deceleration generation unit 99 calculates the preliminary deceleration as shown in FIG. 5 on the basis of the remaining distance Ds calculated by a remaining distance calculation unit 101*a* and the target speed table Tv stored in a target speed table storage unit 99*a*. On the other hand, the normal deceleration generation unit 100 generates the normal deceleration for stopping the host vehicle 11 at the vehicle stop position Ps on the basis of the remaining distance Ds and the vehicle speed Ve (deceleration that changes in more detail than the target speed set by the preliminary deceleration generation unit 99). To the trajectory evaluation unit 94, one of the preliminary deceleration and the normal deceleration is input in the strop control. Then, the trajectory evaluation unit 94 evaluates the trajectory candidate that suits the input deceleration, and sets the short-term stop trajectory (preliminary short-term stop trajectory, normal short-term stop trajectory).

Figure 9:
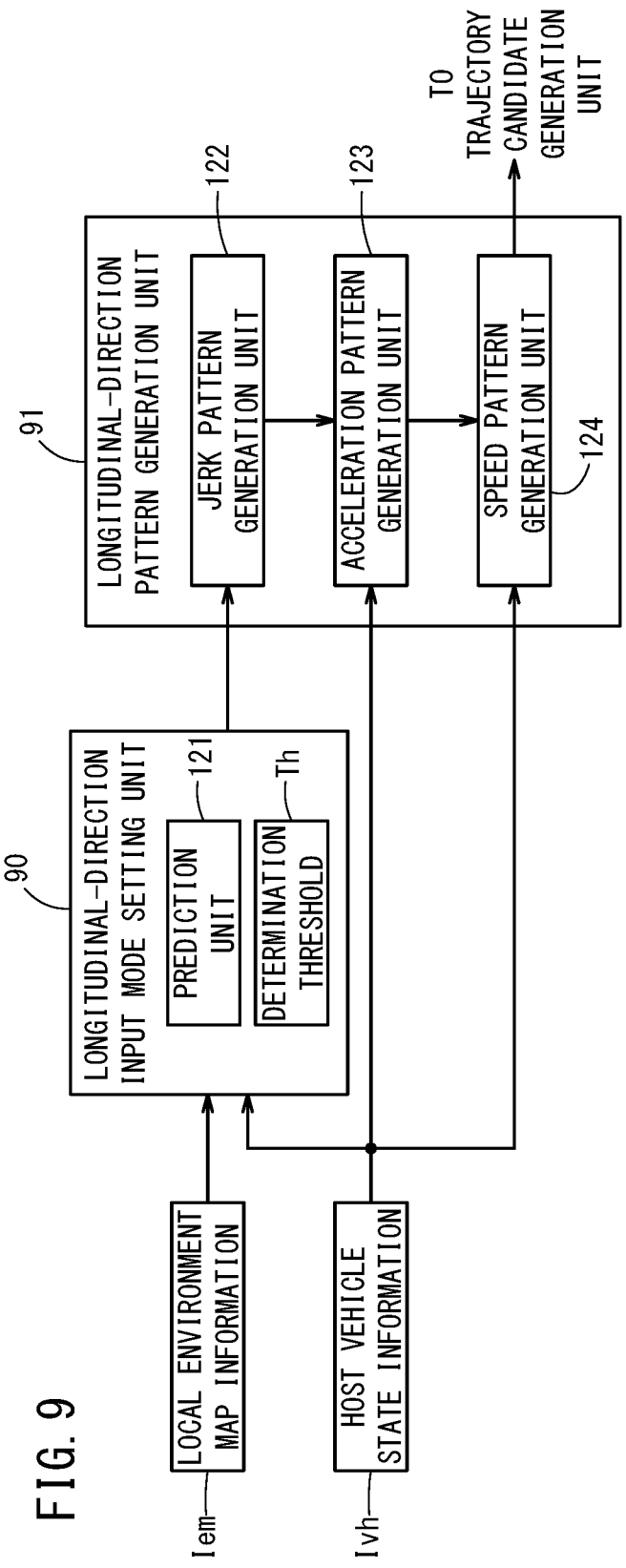
FIG. 9 is a block diagram illustrating a configuration of a longitudinal-direction input mode setting unit and a longitudinal-direction pattern generation unit.

In addition, a function of the short-term trajectory generation unit 73 that is different from the function of the medium-term trajectory generation unit 72 is to generate the longitudinal-direction pattern (speed pattern) in consideration of the jerk (jerk) of the host vehicle 11 on the basis of the local environment map information Iem and the host vehicle state information Ivh. Therefore, the longitudinal-direction pattern generation unit 91 internally includes a jerk pattern generation unit 122, an acceleration pattern generation unit 123, and a speed pattern generation unit 124 as illustrated in FIG. 9.

The jerk pattern generation unit 122 is a function unit that generates a jerk pattern (hereinafter referred to as jerk value j) and outputs the jerk pattern to the acceleration pattern generation unit 123. The jerk pattern generation unit 122 generates a predetermined number of jerk values j on the basis of the limited calculation process time and the calculation resource for the local environment map information Iem and the host vehicle state information Ivh.

Figure 10:
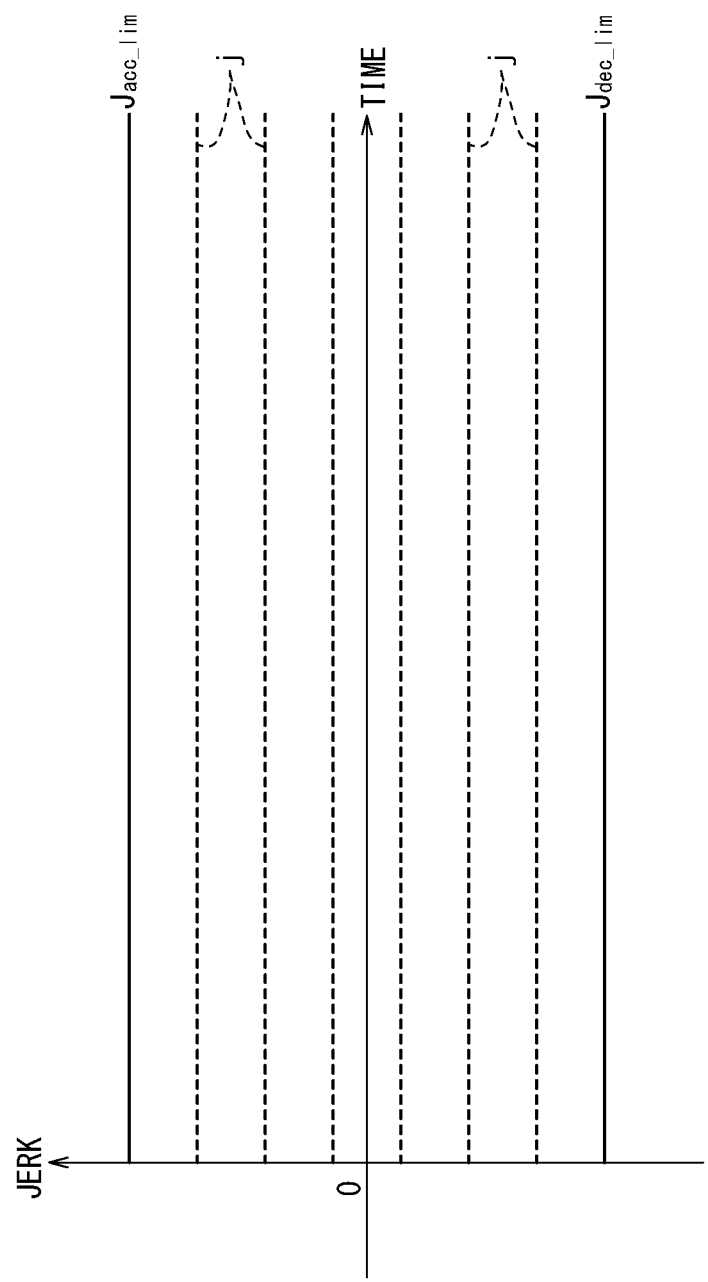
FIG. 10 is a graph for schematically showing setting of jerk values in normal travel.

Specifically, in the case where the jerk value j is generated in the normal travel (when vehicle stop position Ps is not detected), the jerk values j are calculated dispersedly and equally in the range of an acceleration jerk limit $J_{acc\_lim}$ and a deceleration jerk limit $J_{dec\_lim}$ as shown in FIG. 10. Thus, the short-term trajectory generation unit 73 can generate the trajectory candidate in the wide speed range (jerk range) in the trajectory candidate generation unit 93 in the normal travel. As a result, the trajectory evaluation unit 94 can evaluate the trajectory of the appropriate speed pattern among the trajectory candidates of various speed patterns, and finally output the short trajectory St.

Note that the acceleration jerk limit $J_{acc\_lim}$ is a limit value in enhancing the change in acceleration, and is larger than that when the jerk is zero. Moreover, the deceleration jerk limit $J_{dec\_lim}$ is a limit value in weakening the change in acceleration, and is smaller than that when the jerk is zero. For example, the acceleration jerk limit $J_{acc\_lim}$ and the deceleration jerk limit $J_{dec\_lim}$ are set to the value for adjusting the speed of the host vehicle 11 in the range of not increasing or decreasing the acceleration of the host vehicle 11 suddenly in consideration of the vehicle dynamics, the acceleration/deceleration capability of the host vehicle 11, or the like.

Back to FIG. 9, the acceleration pattern generation unit 123 generates a predetermined number of acceleration patterns on the basis of the host vehicle state information Ivh and the predetermined number of jerk values j that are input from the jerk pattern generation unit 122. The acceleration pattern is generated easily by integrating each jerk value j, and the host vehicle state information Ivh is used for calculating a constant of integration, for example. The generated acceleration pattern is output to the speed pattern generation unit 124.

The speed pattern generation unit 124 generates a predetermined number of speed patterns on the basis of the host vehicle state information Ivh and the predetermined number of acceleration patterns received from the acceleration pattern generation unit 123. The speed pattern can also be formed easily by integrating the acceleration pattern, and the host vehicle state information Ivh is used for calculating the constant of integration, for example. Then, the speed pattern generation unit 124 outputs the calculated speed patterns to the trajectory candidate generation unit 93.

In the stop control, the short-term trajectory generation unit 73 according to the present embodiment performs a process of predicting the stop state of the host vehicle 11 and changing the deceleration mode on the basis of the prediction result. Therefore, the short-term trajectory generation unit 73 includes the longitudinal-direction input mode setting unit 90 of selecting one deceleration mode among three deceleration modes for the following first to third circumstances on an upstream side of the longitudinal-direction pattern generation unit 91.

First circumstance: the host vehicle 11 stops beyond the vehicle stop position Ps Second circumstance: the host vehicle 11 stops at a position not beyond the vehicle stop position Ps and away from the vehicle stop position Ps to some extent Third circumstance: the host vehicle 11 stops at a position not beyond the vehicle stop position Ps and near the vehicle stop position Ps Specifically, the longitudinal-direction input mode setting unit 90 includes a prediction unit 121 for predicting the position where the host vehicle 11 stops with respect to the vehicle stop position Ps on the basis of the host vehicle state information Ivh. The prediction unit 121 calculates a stop prediction position Pp where the host vehicle 11 stops at jerk=0 along the current short-term stop trajectory, on the basis of the local environment map information Iem (current position P0) and the host vehicle state information Ivh. Thus, a stop prediction distance Dp corresponding to the distance from the current position P0 to the stop prediction position Pp is obtained. In addition, the prediction unit 121 calculates a relative distance D1 by subtracting the calculated stop prediction distance Dp from the remaining distance Ds that is from the current position P0 to the vehicle stop position Ps. This relative distance D1 can be regarded as the distance that is used to predict the first to third circumstances.

Therefore, the longitudinal-direction input mode setting unit 90 selects any of the first to third deceleration modes in accordance with the first to third circumstances on the basis of this relative distance D1.

Figure 11A:
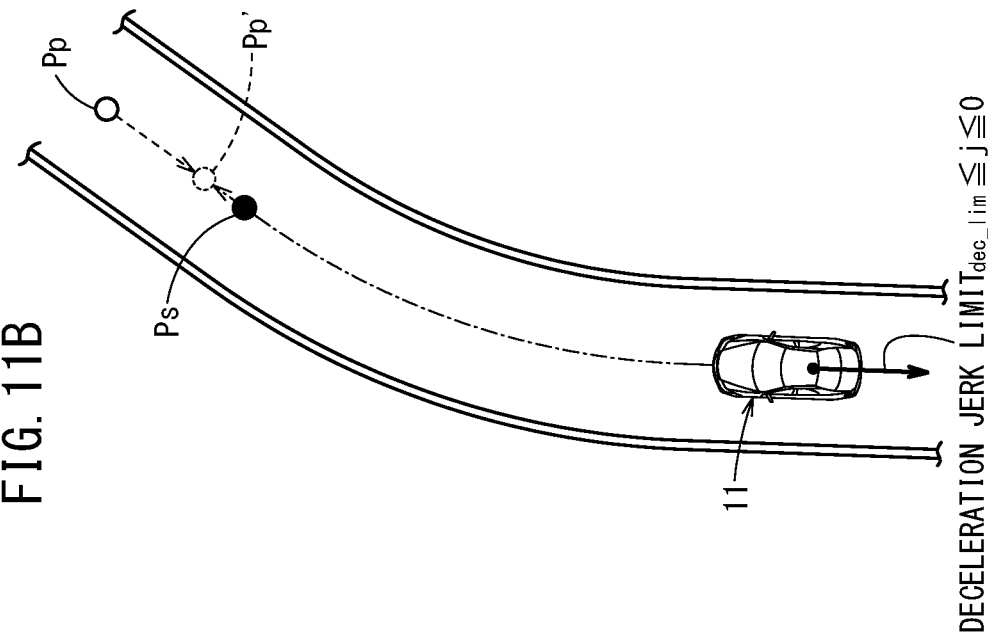
FIG. 11A is a plan view for describing a first circumstance where a host vehicle stops beyond the vehicle stop position.

Here, the first circumstance can be regarded as the state in which the host vehicle 11 stops at the stop prediction position Pp beyond the detected vehicle stop position Ps even though the host vehicle 11 is controlled with the stop trajectory generated continuously in accordance with the current vehicle speed Ve as illustrated in FIG. 11A. If the host vehicle 11 stops at this stop prediction position Pp, the host vehicle 11 is more likely to interrupt the passing of the traffic participant or to be in contact with the traffic participant, for example, which is disadvantageous.

In view of this, the longitudinal-direction input mode setting unit 90 having recognized that the relative distance D1 (=Ds−Dp)<0 m instructs the longitudinal-direction pattern generation unit 91 to perform the first deceleration mode. On the basis of the first deceleration mode, a jerk pattern generation unit 125 generates a predetermined number of jerk values j so as to enhance the degree of deceleration of the host vehicle 11. Enhancing the degree of deceleration corresponds to increasing the change of deceleration, that is, decreasing the jerk.

Figure 12:
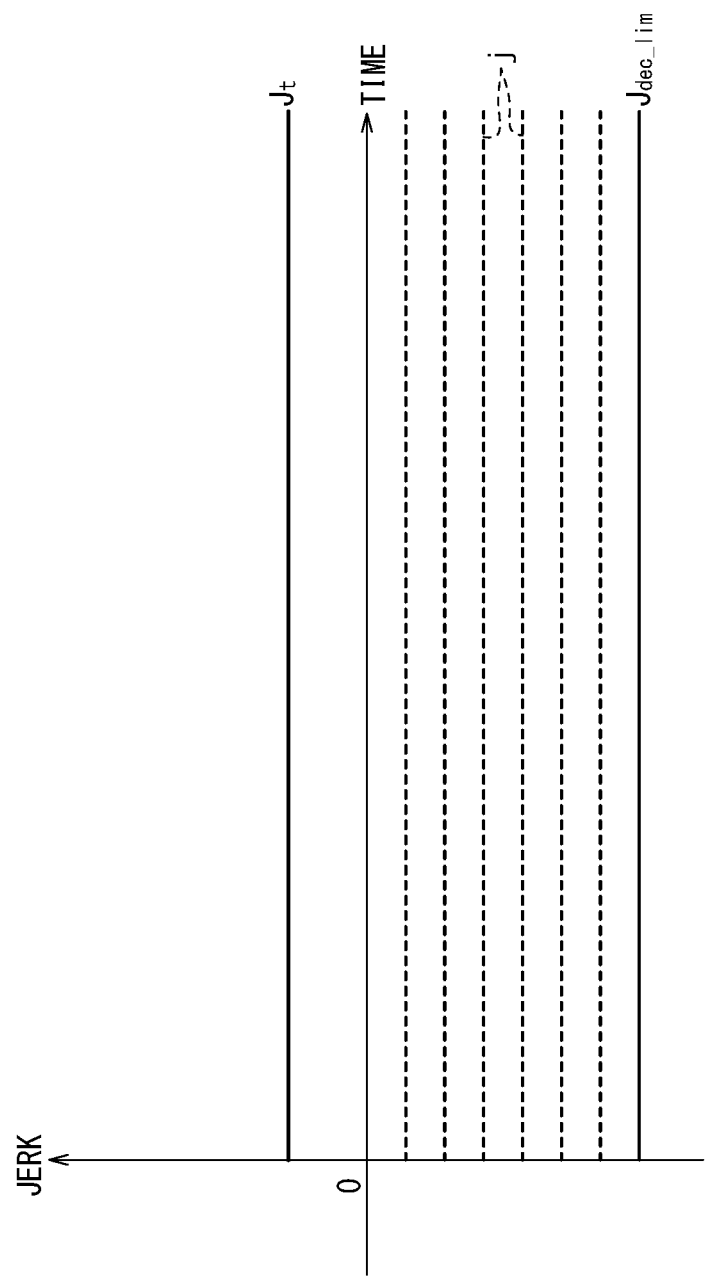
FIG. 12 is a graph for schematically showing setting of the jerk values in the first deceleration mode.

Specifically, the jerk pattern generation unit 125 sets the range of the deceleration jerk limit $J_{dec\_lim}$ from 0, and in this range, assigns the predetermined number of (1 or more) jerk values j (jerk patterns) equally as shown in FIG. 12. This number of generated jerk values j is the same as the number of short-term trajectories that are generated normally. Thus, in the stop control, the predetermined number of jerk values j can be calculated in the range narrower than when the normal short-term trajectory is generated while the unnecessary generation of the jerk values j is suppressed. Therefore, the host vehicle 11 can be stopped more accurately. In particular, in the present embodiment, the jerk pattern range is changed in accordance with the first to third circumstances, and the speed pattern that is more suitable to the circumstance of the host vehicle 11 can be created.

Figure 11B:
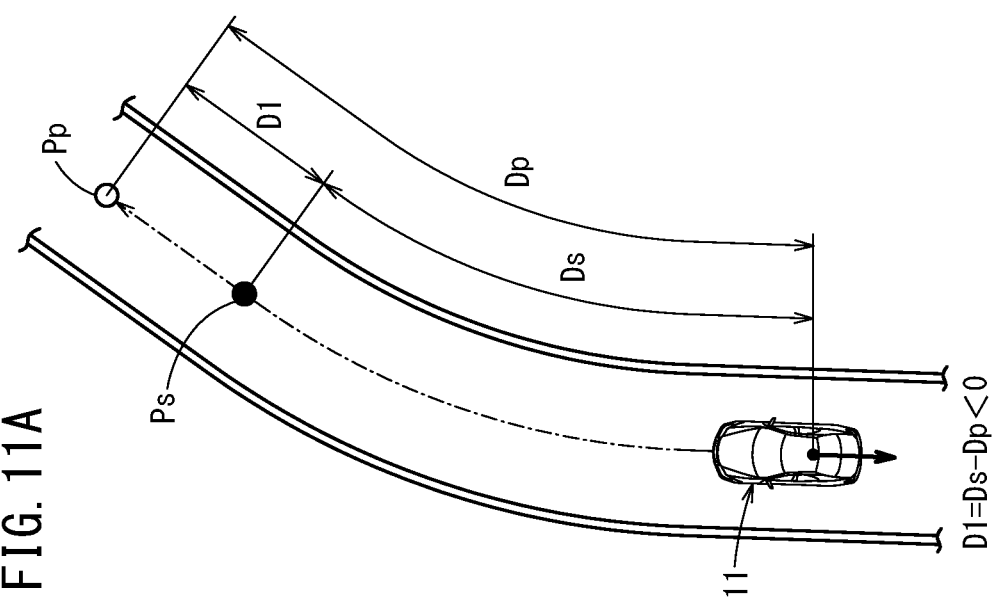
FIG. 11B is a plan view for describing a state where the host vehicle is decelerated by a first deceleration mode.

Then, the trajectory candidate generation unit 93 having received the predetermined number of speed patterns from the longitudinal-direction pattern generation unit 91 generates the plurality of trajectory candidates together with the lateral-direction patterns from the lateral-direction pattern generation unit 92. Therefore, the short-term stop trajectory that is output finally in the first deceleration mode is the point sequence that is dense so that the vehicle speed Ve decreases more sharply. As illustrated in FIG. 11B showing virtually the change of the stop prediction position Pp, correction is performed so that a stop prediction position Pp' recedes to get close to the vehicle stop position Ps. The vehicle control unit 110 directly receives the corrected short-term stop trajectory (target speed), which immediately influences on the braking control of the host vehicle 11. Thus, the vehicle control unit 110 operates to stop the host vehicle 11 in accordance with the vehicle stop position Ps.

Figure 13A:
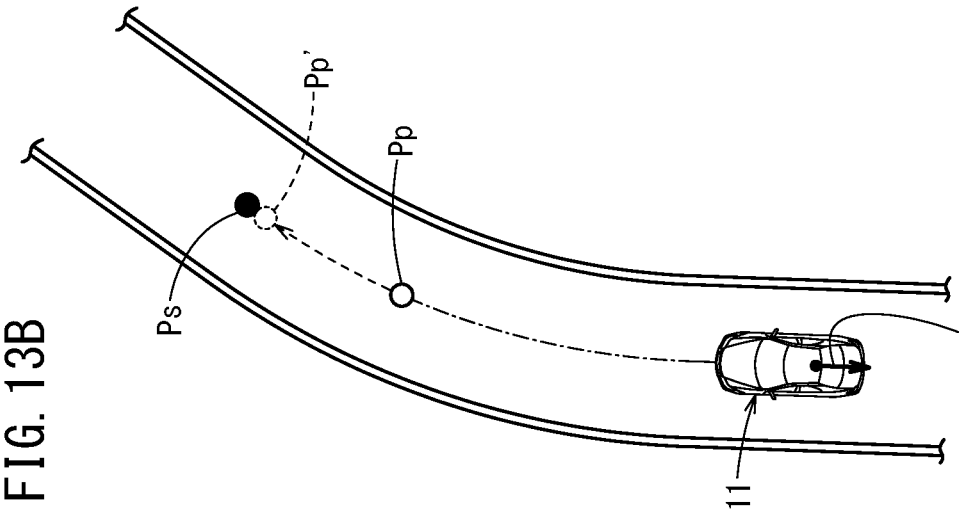
FIG. 13A is a plan view for describing a second circumstance where the host vehicle stops before the vehicle stop position to some extent.

The second circumstance can be regarded as the state in which the host vehicle 11 stops at a position away from the detected vehicle stop position Ps toward the host vehicle 11 to some extent even though the host vehicle 11 is controlled with the stop trajectory generated continuously in accordance with the current vehicle speed Ve as illustrated in FIG. 13A. If the host vehicle 11 stops at this stop prediction position Pp, the host vehicle 11 is at the position away from the stop line; therefore, the smooth travel in the entire travel path is influenced.

In view of this, the longitudinal-direction input mode setting unit 90 having recognized that the relative distance D1 (=Ds−Dp)>0.5 m instructs the longitudinal-direction pattern generation unit 91 to perform the second deceleration mode. Note that 0.5 m to be compared with the relative distance D1 is a determination threshold Th to determine whether to allow the displacement of the stop position of the host vehicle 11. On the basis of the second deceleration mode, the jerk pattern generation unit 125 generates a predetermined number of jerk values j so as to weaken the degree of deceleration of the host vehicle 11. Weakening the degree of deceleration corresponds to decreasing the change of deceleration, that is, increasing the jerk.

Figure 14:
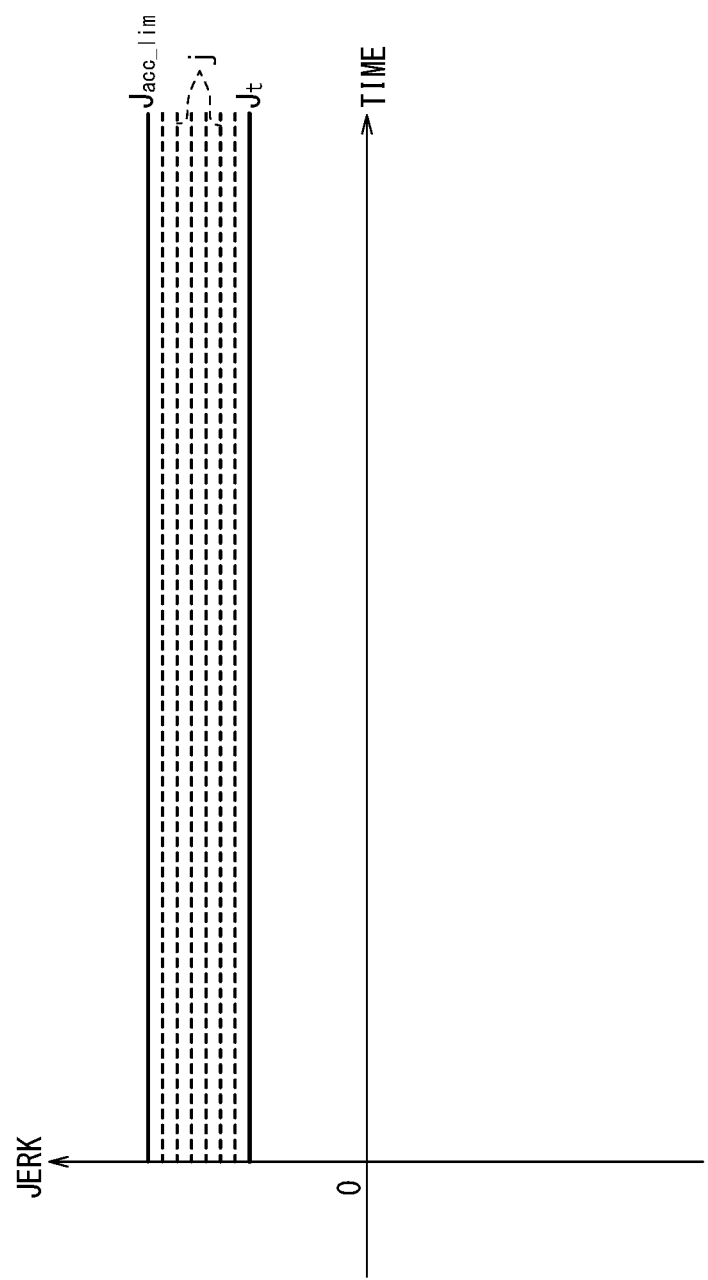
FIG. 14 is a graph for schematically showing setting of the jerk values in the second deceleration mode.

The jerk pattern generation unit 125 sets the range of the target jerk value $J_t$ for zero convergence from the acceleration jerk limit $J_{acc\_lim}$, and in this range, assigns the predetermined number of (1 or more) jerk values j equally as shown in FIG. 14. The target jerk value $J_t$ is calculated from the following expression (1) on the basis of the acceleration $a_0$ and the vehicle speed Ve included in the latest host vehicle state information Ivh, for example.

$$J_t = a_0^2 / 2Ve \quad (1)$$

Figure 13B:
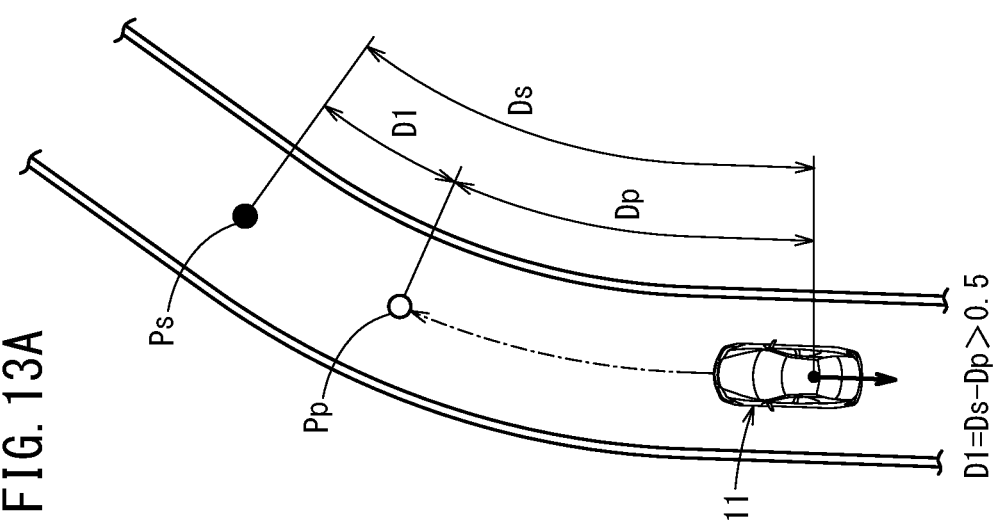
FIG. 13B is a plan view for describing a state where the host vehicle is decelerated by a second deceleration mode.

Then, the trajectory candidate generation unit 93 having received the predetermined number of speed patterns from the longitudinal-direction pattern generation unit 91 generates the plurality of trajectory candidates together with the lateral-direction patterns from the lateral-direction pattern generation unit 92. Therefore, the short-term stop trajectory that is output finally in the second deceleration mode is the point sequence that is sparse so that the vehicle speed Ve decreases more gradually. As illustrated in FIG. 13B showing virtually the change of the stop prediction position Pp, correction is performed so that the stop prediction position Pp' advances to get close to the vehicle stop position Ps.

Figure 15B:
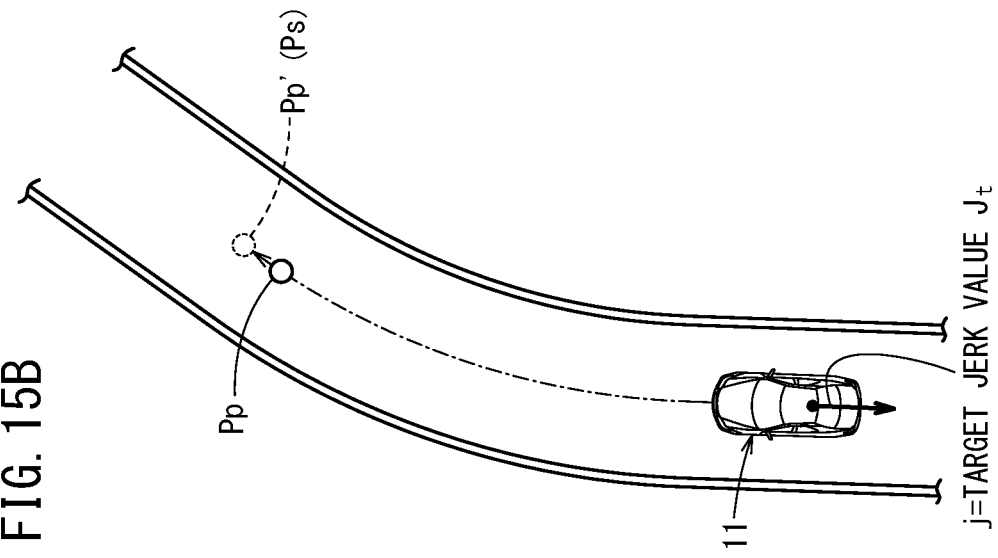
FIG. 15B is a plan view for describing a state where the host vehicle is decelerated by a third deceleration mode.
Figure 15A:
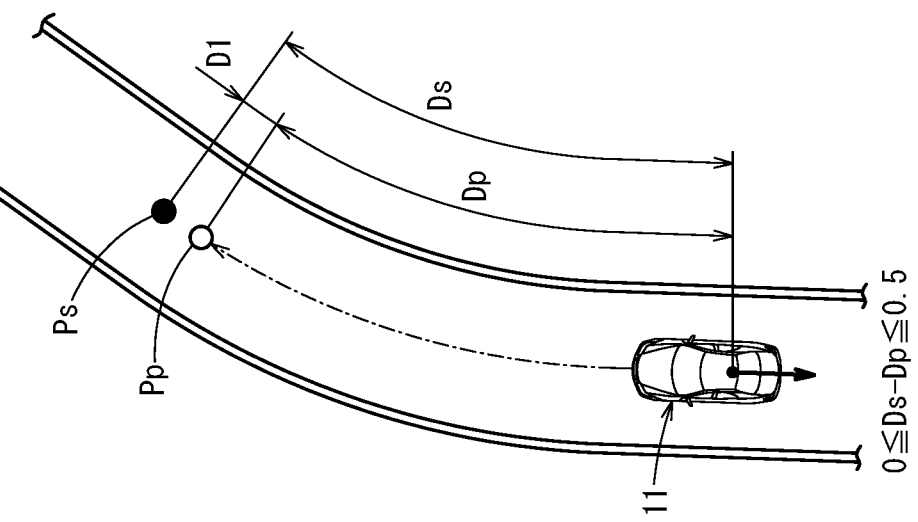
FIG. 15A is a plan view for describing a third circumstance where the host vehicle stops near the vehicle stop position not beyond the vehicle stop position.

The third circumstance can be regarded as the state in which the host vehicle 11 does not go beyond the detected vehicle stop position Ps and stops at the position that is near the vehicle stop position Ps when the host vehicle 11 is controlled with the stop trajectory generated continuously in accordance with the current vehicle speed Ve as illustrated in FIG. 15A.

In view of this, the longitudinal-direction input mode setting unit 90 having recognized that 0 m≤relative distance D1 (=Ds−Dp)≤0.5 m, instructs the longitudinal-direction pattern generation unit 91 to perform the third deceleration mode. On the basis of the third deceleration mode, the jerk pattern generation unit 125 generates a predetermined number of jerk values j so that the degree of deceleration of the host vehicle 11 becomes zero at the vehicle stop position Ps. Making the degree of deceleration zero at the vehicle stop position Ps corresponds to the case where there is no change in the acceleration at the position where the host vehicle 11 stops.

Figure 16:
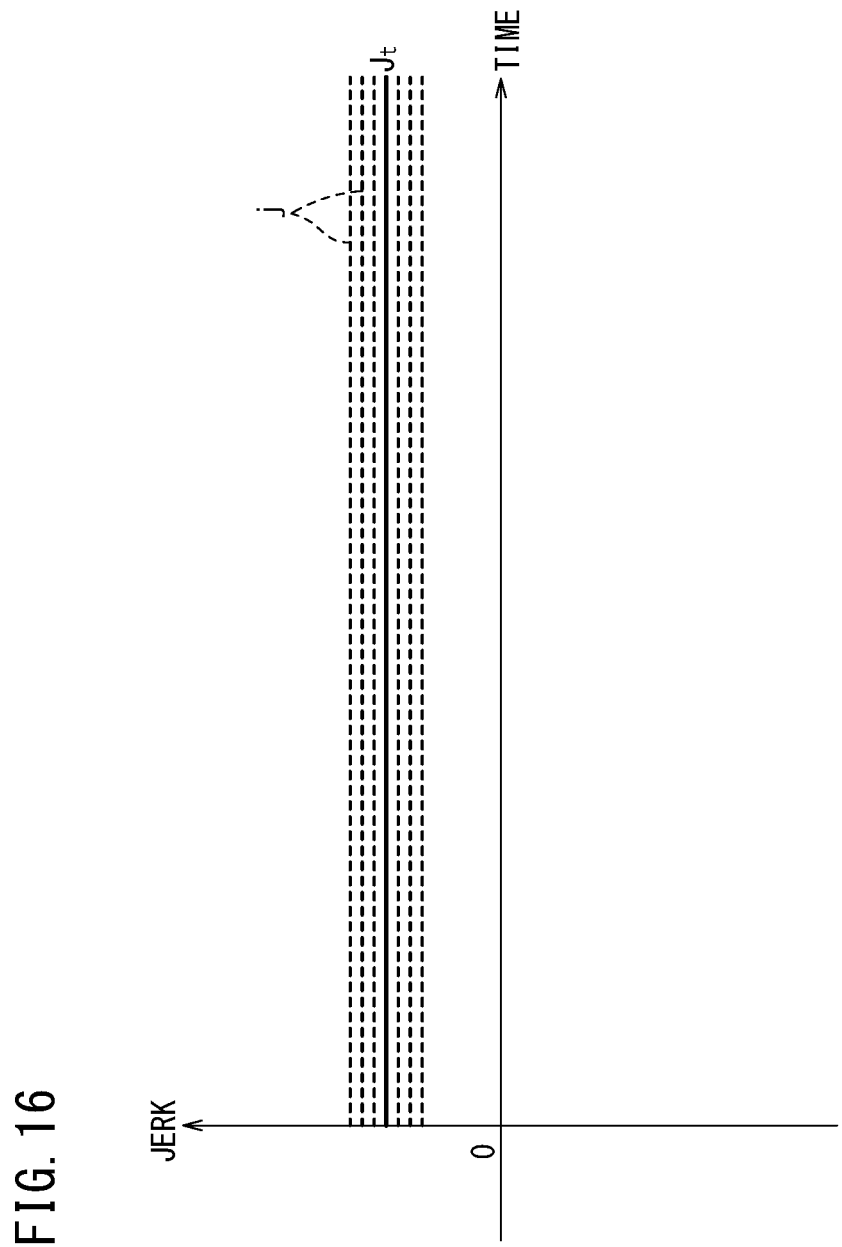
FIG. 16 is a graph for schematically showing setting of the jerk values in the third deceleration mode.

The jerk pattern generation unit 125 sets the target jerk value $J_t$ for zero convergence, and in the range around this target jerk value $J_t$, assigns the predetermined number of jerk values j equally as shown in FIG. 16. Then, the trajectory candidate generation unit 93 having received the predetermined number of speed patterns from the longitudinal-direction pattern generation unit 91 generates the plurality of trajectory candidates together with the lateral-direction patterns from the lateral-direction pattern generation unit 92.

Therefore, when the host vehicle 11 operates along the short-term stop trajectory output finally in the third deceleration mode, the vehicle occupant in the host vehicle 11 does not feel (or feels less) acceleration at the stop of the host vehicle 11. As illustrated in FIG. 15B showing virtually the change of the stop prediction position Pp, the short-term stop trajectory is generated (corrected) as the trajectory for complete stop where the vehicle speed, acceleration, or jerk becomes zero exactly at the vehicle stop position Ps.

[Process Flow of Changing Deceleration Mode]

Figure 17:
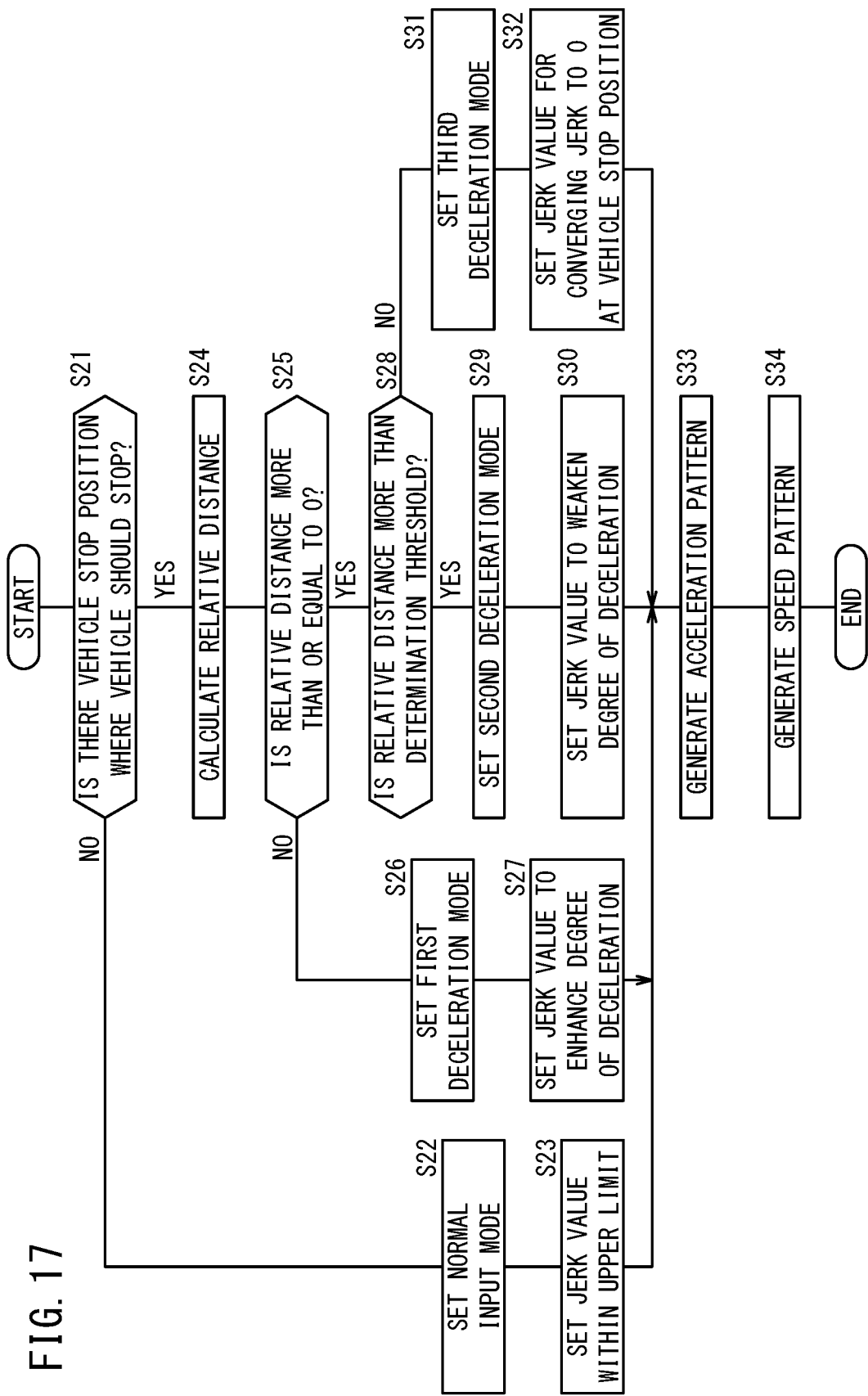
FIG. 17 is a flowchart showing a process flow of a normal deceleration trajectory generation unit of the short-term trajectory generation unit.

Next, one example of a process flow of the aforementioned short-term trajectory generation unit 73 is described with reference to FIG. 17. When the host vehicle 11 has approached the vehicle stop position Ps to some extent, the short-term trajectory generation unit 73 performs the control of stopping the host vehicle 11 in accordance with the vehicle stop position Ps. Specifically, the short-term trajectory generation unit 73 determines whether there is the vehicle stop position Ps where the host vehicle 11 should stop (the stop line, the traffic light, or the like) in the travel path on the basis of the information of the local environment map information Iem (step S21).

If the vehicle stop position Ps is not detected in step S21, the longitudinal-direction input mode setting unit 90 sets a normal input mode for causing the host vehicle 11 to travel (step S22). On the basis of the setting of the normal input mode, the jerk pattern generation unit 122 of the longitudinal-direction pattern generation unit 91 sets the range of the acceleration jerk limit $J_{acc\_lim}$ to the deceleration jerk limit $J_{dec\_lim}$ and generates a predetermined number of jerk values j within the upper limit (step S23). By the predetermined number of jerk values j, the short-term trajectory St in which the speed is adjusted in the range of not increasing or decreasing the acceleration of the host vehicle 11 suddenly is generated finally.

On the other hand, if the vehicle stop position Ps is detected in step S21, the longitudinal-direction input mode setting unit 90 (prediction unit 121) calculates the stop prediction distance Dp and at the same time, calculates the relative distance D1 by subtracting the stop prediction distance Dp from the remaining distance Ds (step S24).

The longitudinal-direction input mode setting unit 90 determines whether the relative distance D1 is less than 0 m (D1<0 m) (step S25), and if the relative distance D1 is less than 0 m, the longitudinal-direction input mode setting unit 90 sets the first deceleration mode (step S26). If the first deceleration mode is set in step S26, the jerk pattern generation unit 122 generates a predetermined number of jerk values j that are less than or equal to 0 and more than or equal to the deceleration jerk limit $J_{dec\_lim}$ in order to enhance the degree of the deceleration of the host vehicle 11 (step S27).

On the other hand, if the relative distance D1 is more than or equal to 0 m in step S25 (D1≥0 m), it is determined whether the relative distance D1 is more than the determination threshold Th (see FIG. 9, 0.5 m in the present embodiment) (step S28). If the relative distance D1 is more than the determination threshold Th, the second deceleration mode is set (step S29), and if the relative distance D1 is less than or equal to the determination threshold Th, the third deceleration mode is set (step S31).

If the second deceleration mode is set in step S29, the jerk pattern generation unit 122 generates a predetermined number of jerk values j between the target jerk value $J_t$ and the acceleration jerk limit $J_{acc\_lim}$ (step S30). If the third deceleration mode is set in step S31, the jerk pattern generation unit 122 generates a predetermined number of jerk values j that are different around the target jerk value $J_t$ (step S32).

Then, the predetermined number of jerk values j generated in steps S23, S27, S30, or S32 are generated in the acceleration pattern in the acceleration pattern generation unit 123 (step S33). The acceleration pattern generated in the acceleration pattern generation unit 123 is generated in the speed pattern in the speed pattern generation unit 124 (step S34). Then, this speed pattern is output as the longitudinal-direction pattern to the trajectory candidate generation unit 93.

Thus, the short-term trajectory generation unit 73 outputs the short-term stop trajectory for stopping the host vehicle 11 more accurately at the vehicle stop position Ps. The vehicle control unit 110 generates the vehicle control value Cvh on the basis of this short-term stop trajectory, and drives each output device. For example, if the third deceleration mode is set in the longitudinal-direction input mode setting unit 90, the host vehicle 11 can be stopped at the vehicle stop position Ps without causing the vehicle occupant to feel acceleration.

As described above, the vehicle control device 10 according to the present embodiment sets the stop trajectory in accordance with the remaining distance Ds using the target speed table Tv by the preliminary deceleration trajectory generation unit 87 of the stop trajectory generation unit 89 and the preliminary deceleration generation unit 99 of the stop trajectory generation unit 101. Thus, in the stop control, the host vehicle 11 can be decelerated so as to achieve the target speed in accordance with the remaining distance Ds regardless of the detection state of the vehicle stop position Ps. Therefore, the vehicle speed Ve of the host vehicle 11 is sufficiently low when the vehicle stop position Ps is detected accurately, and the vehicle control device 10 can stop the host vehicle 11 at the vehicle stop position Ps more stably and suitably.

In this case, if the external environment recognition result Ip is not reliable, the medium-term trajectory generation unit 72 and the short-term trajectory generation unit 73 generate the preliminary medium-term stop trajectory and the preliminary deceleration in accordance with the remaining distance Ds by the preliminary deceleration trajectory generation unit 87 and the preliminary deceleration generation unit 99. Thus, the vehicle control device 10 can preliminarily decelerate the host vehicle 11. Then, the vehicle control device 10 can provide the reliability Re that is appropriate on the basis of the kind of the external environment sensor 14, the navigation device 16, the communication device 20, or the like. Therefore, the operation of the preliminary deceleration trajectory generation unit 87 and the normal deceleration trajectory generation unit 88 and the operation of the preliminary deceleration generation unit 99 and the normal deceleration generation unit 100 can be selected as appropriate on the basis of the reliability Re. Furthermore, the vehicle control device 10 can provide the reliability Re that is appropriate to the external environment recognition information Ipr also from the factor of the road state, the external environment circumstance, or the device state.

In addition, the medium-term trajectory generation unit 72 and the short-term trajectory generation unit 73 can set the stop trajectory easily in accordance with the remaining distance Ds with reference to the target speed table Tv stored in the storage device 40. In the target speed table Tv, the target speed is set stepwise in accordance with the remaining distance Ds; therefore, even though the vehicle stop position Ps includes an error, the target speed can be set to incorporate and allow the error. In addition, the vehicle control device 10 can decelerate the host vehicle 11 more smoothly because the target speed in the target speed table Tv equally decreases as the remaining distance Ds becomes shorter for each predetermined range.

If the short-term trajectory generation unit 73 predicts that the stop prediction position Pp will be set beyond the vehicle stop position Ps, the vehicle control device 10 according to the present embodiment corrects the short-term stop trajectory so as to enhance the degree of the deceleration of the host vehicle 11. Thus, the host vehicle 11 can be decelerated to get closer to the vehicle stop position Ps. On the other hand, if it is predicted that the stop prediction position Pp will be set before the vehicle stop position Ps, the vehicle control device 10 corrects the short-term stop trajectory so as to weaken the degree of the deceleration of the host vehicle 11, so that the host vehicle 11 can be decelerated to get closer to the vehicle stop position Ps.

In this case, the longitudinal-direction pattern generation unit 91 can easily generate the short-term stop trajectory by setting the jerk value j (rate of change of deceleration) of the host vehicle 11 and repeatedly integrating the jerk value j in generating (correcting) the short-term stop trajectory. If the relative distance D1 is less than or equal to the determination threshold Th, the target speed is corrected so that the deceleration of the host vehicle 11 becomes zero at the vehicle stop position Ps; thus, the acceleration of the host vehicle 11 at the vehicle stop position Ps becomes zero. Therefore, the vehicle occupant does not feel weighting (acceleration) and the ride quality is improved. At the same time, an inconvenience that the actual stop position is displaced because the host vehicle 11 moves relative to the vehicle stop position Ps can be prevented.

That is to say, the vehicle control device 10 can improve the ride quality of the vehicle occupant by changing the deceleration mode of the host vehicle 11 in accordance with the first to third circumstances. In addition, the host vehicle 11 can be completely stopped at the vehicle stop position Ps more accurately and the error in detecting the vehicle stop position Ps and the like can be reduced as much as possible.

Note that the vehicle control device 10 according to the present embodiment is not limited to the above configurations and may include various applications and modifications. For example, the vehicle control device 10 may be configured to choose whether to perform the correction or may differentiate the correction amount in accordance with the kind of the vehicle stop position Ps included in the local environment map information Iem when the short-term trajectory generation unit 73 (longitudinal-direction pattern generation unit 91) generates the short-term stop trajectory.

For example, as illustrated in FIG. 18A, the object of the vehicle stop position Ps may be the traffic light stop line where the traffic light is provided, a temporary stop line, or a preceding vehicle. In this case, the local environment map generation unit 54 outputs the local environment map information Iem to the short-term trajectory generation unit 73 through the integrated control unit 70 so that the local environment map information Iem includes the information about the traffic light stop line, the temporary stop line, and the preceding vehicle.

On the other hand, the longitudinal-direction input mode setting unit 90 in the short-term trajectory generation unit 73 determines whether to change the deceleration mode (perform the correction) on the basis of the information about the stop object included in the local environment map information Iem. For example, if the vehicle stop position Ps is the traffic light stop line or the temporary stop line, any of the first to third deceleration modes is selected (correction is performed), so that the host vehicle 11 can be stopped suitably in accordance with the traffic light stop line or the temporary stop line.

In another example, the correction is not performed if the vehicle stop position Ps is the preceding vehicle; in this case, the host vehicle 11 can easily travel in accordance with the preceding vehicle. In still another example, the correction amount for the temporary stop line is reduced to be less than that for the traffic light stop line; in this case, the host vehicle 11 can advance smoothly from the temporary stop line after the host vehicle 11 is stopped. As described above, by choosing whether to perform the correction of the target speed or differentiating the correction amount on the basis of the information about the traffic light stop line, the temporary stop line, or the preceding vehicle, the host vehicle 11 can be controlled to stop more suitably in accordance with the traffic circumstance.

Alternatively, the vehicle control device 10 may be configured to choose whether to perform the correction on the basis of the reliability Re of the local environment map information Iem as shown in FIG. 18B when the short-term trajectory generation unit 73 (longitudinal-direction pattern generation unit 91) generates the short-term stop trajectory. That is to say, in the case where the reliability Re is low (reliability flag is 0), the correction is not performed; thus, stopping the host vehicle 11 in accordance with the vehicle stop position Ps that is presumed to include an error can be suppressed.

In the case where the reliability Re is high (reliability flag is 1), any of the first to third deceleration modes is selected (correction is performed), so that the host vehicle 11 can be stopped at the vehicle stop position Ps accurately.

The present invention is not limited to the above embodiment and various modifications are possible in the range not departing from the concept of the present invention. For example, the vehicle control device 10 can be employed in the driving assistance where only the speed control is performed, or the driving assistance where the driver performs the manual driving and a monitor, a speaker, or the like as an on-vehicle device shows the target speed or the target steering position. In one example of the driving assistance where the target speed is shown, the deceleration of the target vehicle speed is displayed for each remaining distance Ds to the vehicle stop position Ps, so that the driver is prompted to decelerate as appropriate.

The invention claimed is:

1. A vehicle control device comprising:
a vehicle sensor configured to detect a vehicle speed of a host vehicle;
an external environment sensor configured to detect a vehicle stop position existing ahead of the host vehicle in a traveling direction thereof; and
one or more processors, wherein the one or more processors:
calculate a remaining distance from the host vehicle to the detected vehicle stop position;
set a target speed of the host vehicle on a basis of the remaining distance and the vehicle speed;
predict a stop prediction position where the host vehicle actually stops, on a basis of detection information from the vehicle sensor;
correct the target speed so as to enhance a degree of deceleration of the host vehicle when it is predicted that the stop prediction position will be set beyond the vehicle stop position and weaken the degree of the deceleration of the host vehicle when it is predicted that the stop prediction position will be set before the vehicle stop position;
set a plurality of jerks each corresponding to a rate of change of acceleration or the deceleration of the host vehicle, calculate speeds in accordance with the plurality of jerks, and obtain the target speed among the speeds;
change a setting range for setting the plurality of jerks in accordance with the stop prediction position; and
narrow the setting range of the plurality of jerks when the vehicle stop position is detected, as compared to the setting range of the plurality of jerks when the vehicle stop position is not detected.

2. A vehicle control device comprising:
a vehicle sensor configured to detect a vehicle speed of a host vehicle;
an external environment sensor configured to detect a vehicle stop position existing ahead of the host vehicle in a traveling direction thereof; and
one or more processors, wherein the one or more processors:
calculate a remaining distance from the host vehicle to the detected vehicle stop position;
set a target speed of the host vehicle on a basis of the remaining distance and the vehicle speed;
predict a stop prediction position where the host vehicle actually stops, on a basis of detection information from the vehicle sensor;
correct the target speed so as to enhance a degree of deceleration of the host vehicle when it is predicted that the stop prediction position will be set beyond the vehicle stop position and weaken the degree of the deceleration of the host vehicle when it is predicted that the stop prediction position will be set before the vehicle stop position;
set a plurality of jerks each corresponding to a rate of change of acceleration or the deceleration of the host vehicle, calculate speeds in accordance with the plurality of jerks, and obtain the target speed among the speeds;
change a setting range for setting the plurality of jerks in accordance with the stop prediction position; and
set the setting range of the plurality of jerks so that the jerk becomes less than or equal to zero when the degree of the deceleration of the host vehicle is enhanced.

3. The vehicle control device according to claim 1, wherein:
the one or more processors compare a determination threshold that is set in advance and a relative distance of the stop prediction position with respect to the vehicle stop position if it is predicted that the stop prediction position will be set before the vehicle stop position; and
if the relative distance is more than the determination threshold, the target speed is corrected so that the degree of the deceleration of the host vehicle is continuously weakened, and if the relative distance is less than or equal to the determination threshold, the target speed is corrected so that the deceleration of the host vehicle becomes zero at the vehicle stop position.

4. The vehicle control device according to claim 3, wherein:
the one or more processors set a plurality of jerks each corresponding to a rate of change of acceleration or the deceleration of the host vehicle, calculate speeds in accordance with the plurality of jerks, and obtain the target speed among the speeds; and
if the relative distance is more than the determination threshold, the setting range of the plurality of jerks whose lower limit is a target jerk value at which the jerk is converged to zero is set.

5. The vehicle control device according to claim 3, wherein:
- the one or more processors set a plurality of jerks each corresponding to a rate of change of acceleration or the deceleration of the host vehicle, calculate speeds in accordance with the plurality of jerks, and obtain the target speed among the speeds; and
- if the relative distance is less than or equal to the determination threshold, the setting range of the plurality of jerks is set around a target jerk value at which the jerk is converged to zero.

6. The vehicle control device according to claim 1, wherein:
- the vehicle stop position can be classified into stops based on a traffic light stop line where a traffic light is provided, a temporary stop line, and a preceding vehicle; and
- the one or more processors choose whether or not to perform correction of the target speed, or differentiate a correction amount, on a basis of information about the traffic light stop line, the temporary stop line, or the preceding vehicle.

7. The vehicle control device according to claim 1, wherein:
- the external environment sensor is configured to add information about reliability to the detected vehicle stop position; and
- the one or more processors do not perform correction of the target speed if the reliability is low, and perform the correction of the target speed if the reliability is high.

8. The vehicle control device according to claim 2, wherein:
- the one or more processors compare a determination threshold that is set in advance and a relative distance of the stop prediction position with respect to the vehicle stop position if it is predicted that the stop prediction position will be set before the vehicle stop position; and
- if the relative distance is more than the determination threshold, the target speed is corrected so that the degree of the deceleration of the host vehicle is continuously weakened, and if the relative distance is less than or equal to the determination threshold, the target speed is corrected so that the deceleration of the host vehicle becomes zero at the vehicle stop position.

9. The vehicle control device according to claim 8, wherein:
- the one or more processors set a plurality of jerks each corresponding to a rate of change of acceleration or the deceleration of the host vehicle, calculate speeds in accordance with the plurality of jerks, and obtain the target speed among the speeds; and
- if the relative distance is less than or equal to the determination threshold, the setting range of the plurality of jerks is set around a target jerk value at which the jerk is converged to zero.

10. The vehicle control device according to claim 8, wherein:
- the one or more processors set a plurality of jerks each corresponding to a rate of change of acceleration or the deceleration of the host vehicle, calculate speeds in accordance with the plurality of jerks, and obtain the target speed among the speeds; and
- if the relative distance is less than or equal to the determination threshold, the setting range of the plurality of jerks is set around a target jerk value at which the jerk is converged to zero.

11. The vehicle control device according to claim 2, wherein:
- the vehicle stop position can be classified into stops based on a traffic light stop line where a traffic light is provided, a temporary stop line, and a preceding vehicle; and
- the one or more processors choose whether or not to perform correction of the target speed, or differentiate a correction amount, on a basis of information about the traffic light stop line, the temporary stop line, or the preceding vehicle.

12. The vehicle control device according to claim 2, wherein:
- the external environment sensor is configured to add information about reliability to the detected vehicle stop position; and
- the one or more processors do not perform correction of the target speed if the reliability is low, and perform the correction of the target speed if the reliability is high.

* * * * *